US007224309B2

(12) United States Patent
Shimomura

(10) Patent No.: US 7,224,309 B2
(45) Date of Patent: May 29, 2007

(54) PRECEDING-VEHICLE DETECTING APPARATUS, OWN-VEHICLE CONTROLLING APPARATUS, AND PRECEDING-VEHICLE DETECTING METHOD

(75) Inventor: Noriko Shimomura, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 73 days.

(21) Appl. No.: 11/004,902

(22) Filed: Dec. 7, 2004

(65) Prior Publication Data

US 2005/0122251 A1 Jun. 9, 2005

(30) Foreign Application Priority Data

Dec. 9, 2003 (JP) ............ P 2003-410413

(51) Int. Cl.
*G01S 13/93* (2006.01)
(52) U.S. Cl. ............ 342/70; 342/71; 340/903; 340/435; 340/436; 701/301
(58) Field of Classification Search ............ 342/70–72; 340/903, 435, 436; 701/301
See application file for complete search history.

(56) References Cited

U.S. PATENT DOCUMENTS

| 5,369,590 | A | * | 11/1994 | Karasudani | ............ 701/300 |
| 5,929,803 | A | * | 7/1999 | Uehara et al. | ............ 342/70 |
| 6,018,308 | A | * | 1/2000 | Shirai | ............ 342/70 |
| 6,873,912 | B2 | * | 3/2005 | Shimomura | ............ 701/301 |
| 6,888,622 | B2 | * | 5/2005 | Shimomura | ............ 356/4.01 |
| 2002/0014988 | A1 | * | 2/2002 | Samukawa et al. | ............ 342/70 |
| 2003/0210174 | A1 | * | 11/2003 | Nakamura | ............ 342/70 |
| 2005/0122251 | A1 | * | 6/2005 | Shimomura | ............ 342/70 |
| 2005/0171688 | A1 | * | 8/2005 | Fujita et al. | ............ 701/201 |

FOREIGN PATENT DOCUMENTS

JP 05221253 A * 8/1993

(Continued)

OTHER PUBLICATIONS

"Drive assist system using stereo image recognition", Saneyoshi, K.Intelligent Vehicles Symposium, 1996., Proceedings of the 1996 IEEE Sep. 19-20, 1996 pp. 230-235.*

(Continued)

*Primary Examiner*—John B. Sotomayor
(74) *Attorney, Agent, or Firm*—McDermott Will & Emery LLP

(57) ABSTRACT

To provide a preceding-vehicle detecting apparatus, own-vehicle controlling apparatus and preceding-vehicle detecting method capable of detecting a preceding vehicle in a more reliable manner, a preceding-vehicle detecting apparatus (1) comprises: a millimeter wave radar (11); a measuring-target-point-group generating part (131) setting measuring-target points based on reflected waves, and single-connecting those measuring-target points having the same relative velocities to thereby generate measuring-target point groups, respectively; a group-relative-velocity determining part (132) extracting those measuring-target point groups which meets conditions for preceding vehicle, respectively; and a temporal continuity judging part (133) regarding those measuring-target point groups as preceding vehicles, each of which has a number of detected times equal to or larger than a prescribed value (N1).

21 Claims, 17 Drawing Sheets

FOREIGN PATENT DOCUMENTS

| | | | |
|---|---|---|---|
| JP | 07025286 A | * | 1/1995 |
| JP | 07047862 A | * | 2/1995 |
| JP | 7-225893 | | 8/1995 |
| JP | 9-145833 | | 6/1997 |
| JP | 10000961 A | * | 1/1998 |
| JP | 11153406 A | * | 6/1999 |
| JP | 11-283462 | | 10/1999 |
| JP | 2001-228248 | | 8/2001 |
| JP | 2001-242242 | | 9/2001 |
| JP | 2001-343460 | | 12/2001 |
| JP | 2002-14160 | | 1/2002 |
| JP | 2002-71808 | | 3/2002 |
| JP | 2002-183737 | | 6/2002 |
| JP | 2003-141698 | | 5/2003 |
| JP | 2005090974 A | * | 4/2005 |

OTHER PUBLICATIONS

"Results on visual road recognition for road vehicle guidance", Behringer, R.; Maurer, R.B.M. Intelligent Vehicles Symposium, 1996., Proceedings of the 1996 IEEE Sep. 19-20, 1996 pp. 415-420.*

"Automatic traffic surveillance system for vehicle tracking and classification", Jun-Wei Hsieh; Shih-Hao Yu; Yung-Sheng Chen; Wen-Fong Hu Intelligent Transportation Systems, IEEE Transactions on vol. 7, Issue 2, Jun. 2006 pp. 175-187.*

"Autonomous Driving in Structured and Unstructured Environments", Kolski, S.; Ferguson, D.; Bellino, M.; Siegwart, R., Intelligent Vehicles Symposium, 2006 IEEE Jun. 13-15, 2006 pp. 558-563.*

Japanese Office Action issued in corresponding Japanese Patent Application No. JP 2003-410413, dated Aug. 15, 2006.

* cited by examiner

FIG.3

| SCANNING TIME-SLOT | TRANSMITTED WAVE | | REFLECTED WAVE | | | | |
|---|---|---|---|---|---|---|---|
| | id | W | id | Id | Mjk | I | L |
| ts0 | Rt0 | 0 | Rr0 | <Io | | | |
| ts1 | Rt1 | α | Rr1 | <Io | | | |
| ts2 | Rt2 | 2α | Rr2 | >Io | Mj0 | 2 | L2 |
| ts3 | Rt3 | 3α | Rr3 | >Io | Mj1 | 2 | L3 |
| ts4 | Rt4 | 4α | Rr4 | >Io | Mj2 | 1 | L4 |
| ts5 | Rt5 | 5α | Rr5 | <Io | | | |
| ts6 | Rt6 | 6α | Rr6 | >Io | Mj3 | 2 | L6 |
| ts7 | Rt7 | 7α | Rr7 | >Io | Mj4 | 2 | L7 |
| ts8 | Rt8 | 8α | Rr8 | <Io | | | |
| ts9 | Rt9 | 9α | Rr9 | <Io | | | |
| ts10 | Rt10 | 10α | Rr10 | <Io | | | |

PROCESS WITHIN j-th CONTROL TIME-SLOT TSj $tsi = [t0+i\Delta t, +0+(i+1)\Delta t)$

FIG.5
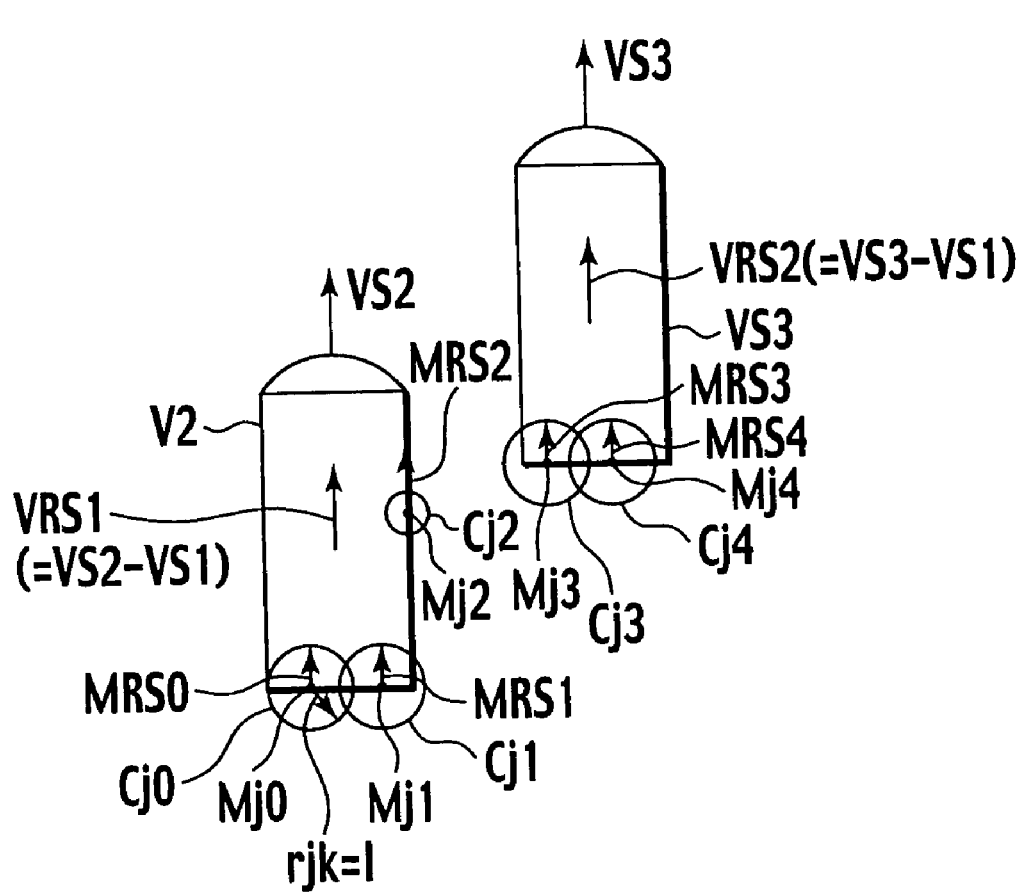
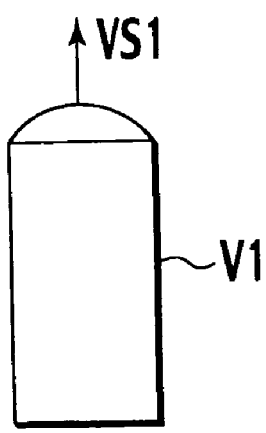

○ : MEASURING-TARGET POINT
(RELATIVE VELOCITY: SMALL)
△ : MEASURING-TARGET POINT
(RELATIVE VELOCITY: LARGE)
(APPROACHING AT VELOCITY SIMILAR TO THAT OF OWN VEHICLE)
▲ : RELATIVE VELOCITY

○ : MEASURING-TARGET POINT (RELATIVE VELOCITY: SMALL)

▲ : RELATIVE VELOCITY

◯ : RESULT OF GROUPING

⬭ : RESULT OF VEHICLE DETECTION

PRECEDING-VEHICLE DETECTING APPARATUS, OWN-VEHICLE CONTROLLING APPARATUS, AND PRECEDING-VEHICLE DETECTING METHOD

BACKGROUND OF THE INVENTION

1. Technical Field

The present invention relates to a preceding-vehicle detecting apparatus, an own-vehicle controlling apparatus, and a preceding-vehicle detecting method.

2. Background Art

JP-A-2001-242242 has disclosed a technique for detecting a preceding vehicle. As used herein, the term "preceding vehicle" means a vehicle preceding an own vehicle.

The technique of JP-A-2001-242242 employs a millimeter wave radar adapted to emit millimeter waves in a forward direction of own vehicle, and receive reflected waves thereof. Based on the reflected waves, measuring-target points are set, and positions and relative velocities of the measuring-target points are calculated. A phase space corresponding to a detecting region is divided into three, and a filter is set for each divided region. Each measuring-target point is applied to a filter corresponding thereto in position, where noises are eliminated. Remaining measuring points have their positions and relative velocities, which are based on to detect a preceding vehicle.

SUMMARY OF THE INVENTION

However, the technique of JP-A-2001-242242, employing no more than three kinds of filters, has a potential failure to fully eliminate noises, with a resultant failure to detect a preceding vehicle.

Further, the millimeter wave radar is adapted, even in a case of a vehicle preceding own vehicle with another preceding vehicle in between, to receive reflected waves from that vehicle, thus having a measuring-target point set in correspondence thereto. It however is impossible to detect the vehicle by the technique of JP-A-2001-242242 in which such measuring-target points are all concluded to be noises. From this point also, the technique of JP-A-2001-242242 has the possibility of failing to detect a preceding vehicle.

The present invention has been made to solve such a problem in the past. It therefore is an object of the invention to provide a preceding-vehicle detecting apparatus, an own-vehicle controlling apparatus and a preceding-vehicle detecting method, which are adapted for a more ensured detection of a preceding vehicle than in the past.

To achieve the object, according to an aspect of the invention, a preceding-vehicle detecting apparatus comprises: a recognizer configured to recognize a measuring-target point group which is assumable to be a preceding vehicle; and a decider configured to decide, the measuring-target point group having been continuously recognized by the recognizing part over a significant period of time, to be the preceding vehicle.

According to another aspect of the invention, an own-vehicle controlling apparatus comprises: a recognizer configured to recognize a measuring-target point group which is assumable to be a preceding vehicle; a decider configured to decide, the measuring-target point group having been continuously recognized by the recognizing part over a significant period of time, to be the preceding vehicle; a lane detecting part detecting a lane on which an own vehicle is cruising; and an own-vehicle controller configured to conduct a cruising control of the own vehicle correspondingly to a running state of a preceding vehicle, when the preceding vehicle is present on the lane and an object is present between the preceding vehicle and the own vehicle.

According to still another aspect of the invention, a preceding-vehicle recognizing method comprises: recognizing a measuring-target point group which is assumable to be a preceding vehicle; and deciding, the measuring-target point group having been continuously recognized over a significant period of time, to be the preceding vehicle.

BRIEF DESCRIPTION OF THE ACCOMPANYING DRAWINGS

The above and further objects, features, and advantages of the present invention will fully appear in the following detailed description of the preferred embodiments of the invention, when the same is read in conjunction with the accompanying drawings, in which:

FIG. 3 is a characteristic table of measuring-target points;

FIG. 5 is a plan view of an exemplary phase space;

DETAILED DESCRIPTION OF THE PREFERRED EMBODIMENTS

There will be detailed below the preferred embodiments of the present invention. It is noted that in the embodiments objectives of reflection are recognized as measuring-target points.

(First Embodiment)

There will be described below a first embodiment of the invention with reference to accompanying drawings.

Description is first made, with reference to FIG. 1 through FIG. 5, of an outline of procedures to be conducted by a preceding vehicle detector as a preceding-vehicle detecting apparatus 1 according to the first embodiment.

Figure 1:
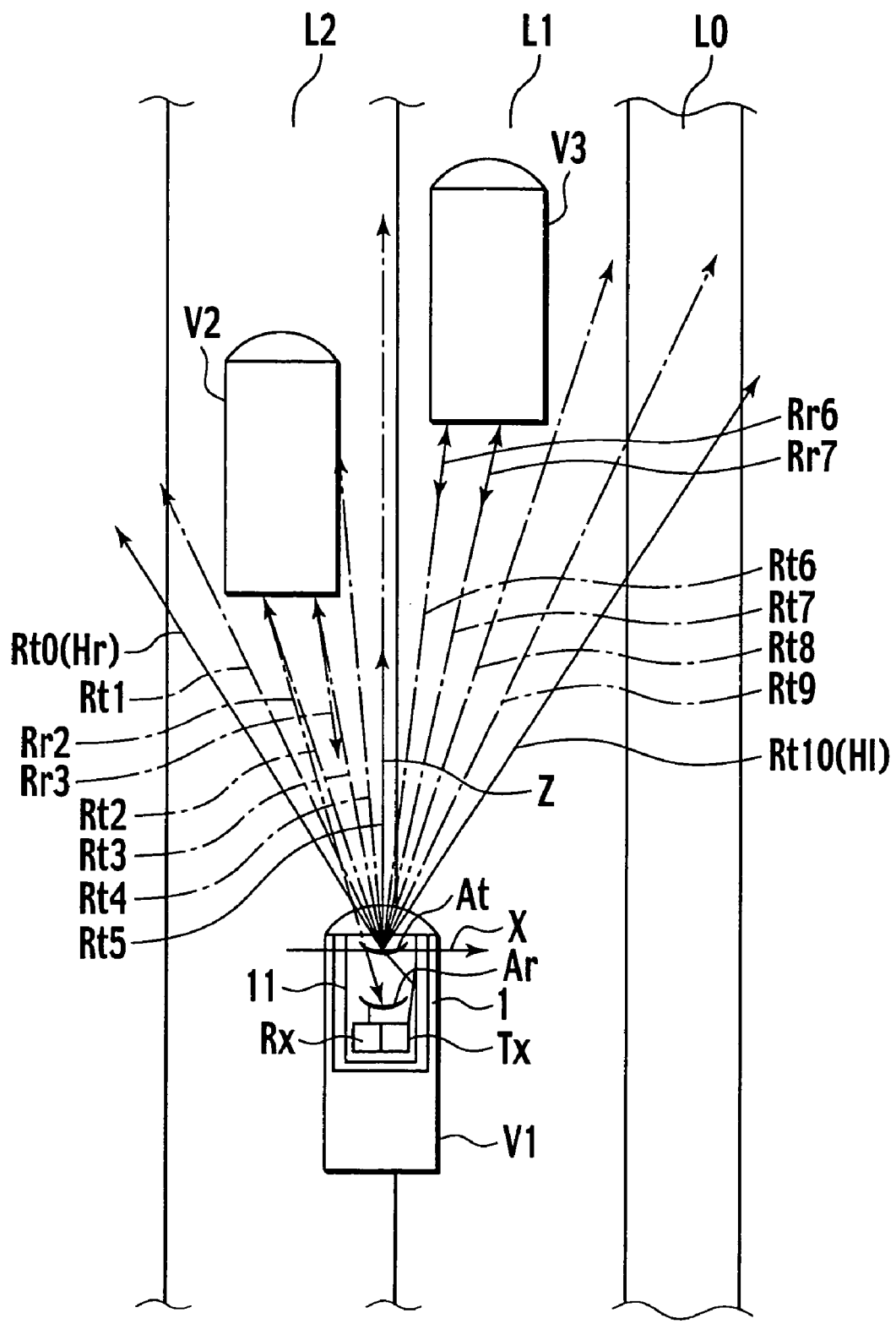
FIG. 1 is a plan view of an expressway having an exemplary situation about an own vehicle.

FIG. 1 is a plan view of an exemplary situation of an expressway, about an own vehicle V1. Alongside a median strip L0, a left overtaking lane L1 and a left cruising lane L2 extend. A preceding vehicle V2 runs in the overtaking lane L1, and another preceding vehicle V3 runs in the cruising lane L2. Running after vehicles V2 and V3 is the own vehicle V1, which is equipped with the preceding-vehicle detecting apparatus 1. The apparatus 1 includes a millimeter wave radar 11, which is configured with a transmitter as a transmitting part Tx and a receiver as a receiving part Rx. The transmitting part Tx has a transmitting antenna At adapted, at a time point t ($=t0+i\Delta t$ (i=0 to 10)), for emitting scan waves Rti from an origin (X=0, Z=0) of an X-Z coordinate system fixed to the own vehicle V1, toward a horizontal direction at a selective scan angle Hs ($=Hr+i\alpha$). The receiving part Rx has a receiving antenna Rt for receiving reflected waves Rti of scan waves Rti, over an entire reception angle thereof. The receiving part Rx is adapted as necessary for processing the reflected waves Rri.

Description is now made of principal actions of the preceding-vehicle detecting apparatus 1.

Figure 2:
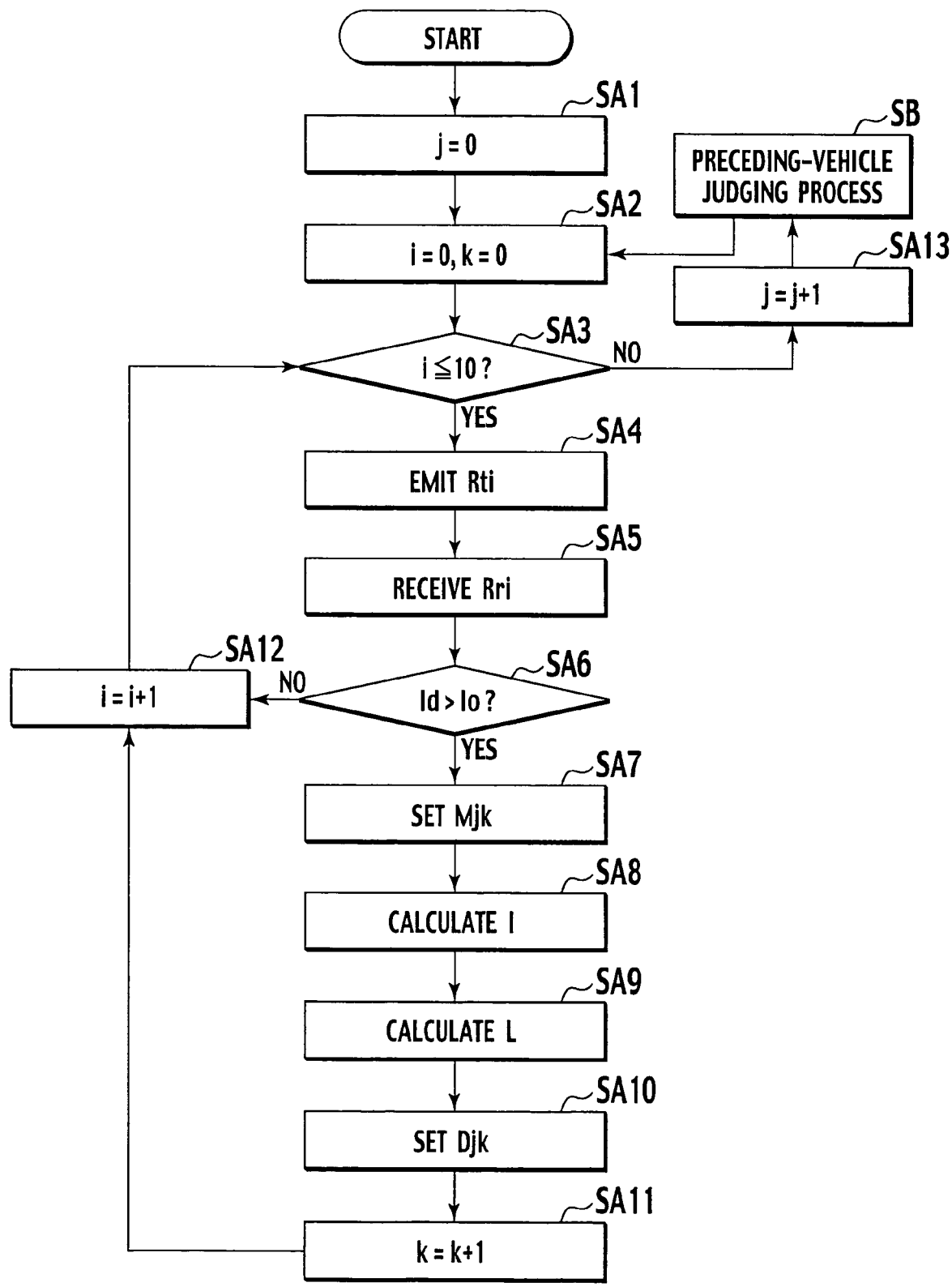
FIG. 2 is a flowchart of control actions of a preceding-vehicle detecting apparatus.

As shown in FIG. 2, the preceding-vehicle detecting apparatus 1 is adapted for a process including steps SA1 through SA13, and for a later-described process SB.

More specifically, at step SA4, scan waves Rti are emitted from the millimeter wave radar 11. At step SA5, reflected waves Rri are received by the millimeter wave radar 11. At step SA6, calculation is made to determine an intensity Id of reflected waves Rri, as they are received, and followed by a decision as to whether the intensity Id exceeds a threshold value I0. At step SA7, a corresponding measuring-target point Mjk is set. At step SA8, the intensity Id is converted into a specific intensity I ($=[Id/I0]$) to be processed as an intensity of the measuring-target point Mjk. At step SA9, calculation is made to determine a distance L from own vehicle V1 to measuring-target point Mjk, and a position of measuring-target point Mjk. Such a measuring-target point Mjk is recognized as a circular region described about a center located at the position of measuring-target point Mjk, with a radius rjk (FIG. 5) corresponding to the intensity I of measuring-target point Mjk. The center position of measuring-target point Mjk is defined by the distance L and the scan angle Hs ($=Hr+i\alpha$), in the X-Z coordinate system fixed to own vehicle V1. At step SA10, a set of data on the coordinates of center, direction, and radius rjk of measuring-target point Mjk is stored to be processed as a measuring-target-point data Djk.

Figure 4:
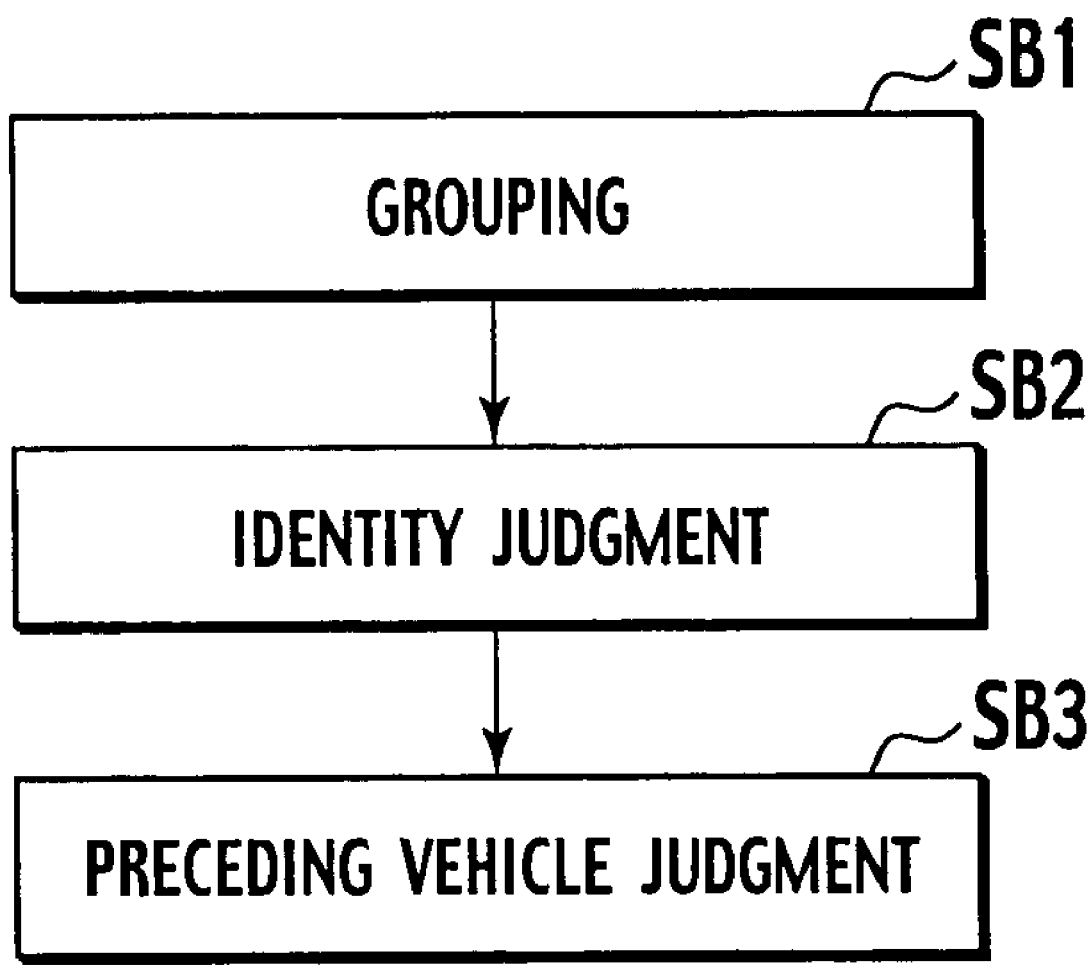
FIG. 4 is a flowchart of control processes of the preceding-vehicle detecting apparatus.

The process SB covers a preceding-vehicle detecting process. FIG. 3 describes how this process proceeds within an arbitrary control time slot TSj. In FIG. 3, $\omega$ denotes a scan direction between Hr and Hl. FIG. 4 shows a schematic control flow of the preceding-vehicle detecting process SB.

At an initial step SB1, calculation is made to determine a relative velocity MRSk of measuring-target point Mjk, which is stored as part of measuring-target-point data Djk. Then, whole measuring-target points Mjk of current cycle are grouped by the relative velocity into one or more by-velocity groups, of which a respective one has its measuring-target points Mjk connected as a single region. Then, for each group of current single-connected points Mjk, after comparison with a previous cycle, the group multiplicity is estimated to thereby set up a commensurate or reasonable number of current groups of measuring-target points Mjk. At a subsequent step SB2, for each current measuring-target-point group, the identity is judged relative to the previous cycle. At a final step SB3, judgment is made of the number of consecutive times of confirmed identity of a respective current measuring-target-point group, for conclusion of the group to be a preceding vehicle when the consecutive time number exceeds a prescribed value.

More specifically, at step SB1, for each measuring-target point Mjk set in a current cycle, a data set of a corresponding measuring-target point M(j-1)k set in a previous cycle is read for calculation to determine a change of distance L between the cycles, and a relative velocity MRSk of current measuring-target point Mjk to own vehicle V1, which are stored as part of a corresponding measuring-target-point data Djk.

Then, a grouping is executed in terms of relative velocity and position. Namely, assuming relative velocities MRSk within a difference range of ±10 to 20(%) to be identical, the measuring-target points Mjk are grouped by relative velocity.

Then, for each by-velocity group, a whole set of measuring-target points Mjk thereof is processed for possibly selecting therefrom one or more subsets of measuring-target points Mjk single-connectable by a prescribed width of variant interval (corresponding to a vehicle width, or more specifically, an interval of 1.5 to 2.5 (m)) to thereby generate a commensurate number of measuring-target point groups.

Then, for each measuring-target point group, the width of its single-connected region is checked. If the region width exceeds a prescribed width, a data set of each measuring-target point group of the previous cycle is processed for calculation to determine a translation vector corresponding to a representative (e.g. average) relative velocity of associated measuring-target points, whereby a movement of the measuring-target point group of previous cycle is estimated for a decision as to whether or not the region exceeding the prescribed width has plural measuring-target point groups located therein.

In an affirmative decision for plural measuring-target point groups, the measuring-target point group in concern is estimated to be a commensurate number of measuring-target point groups having their single-connected regions multiplied or degenerated within the exceeding region.

Or else, the measuring-target point group is assumed as a provisional single measuring-target point group that may be separated into plural groups.

Then, for each measuring-target point group of current cycle, calculation is made to determine a representative position and a representative relative velocity, which are stored. The representative position of measuring-target point group is defined in the X-Z coordinate system fixed to own vehicle V1. The representative position has an X-coordinate thereof as an average or mediate of a maximum and a minimum of X-coordinates of measuring-target points Mjk constituting the measuring-target point group, and a Z-coordinate thereof as a Z-coordinate of a measuring-target point Mjk nearest to own vehicle among the measuring-target points Mjk constituting the measuring-target point group. The representative relative velocity is assumed as an average of relative velocities of all measuring-target points Mjk of the measuring-target point group. As the representative relative velocity, there may be employed a significant-point average as an average of relative velocities of significant measuring-target points Mjk having their radii rjk exceeding a prescribed value, or a trailing-point average as an average of relative velocities of measuring-target points Mjk within a prescribed interval of Z-coordinate zone from a measuring-target point Mjk having a minimum Z-coordinate.

At step SB2, there is conducted a process for judging an identity of each measuring target-point group relative to the previous cycle. Each measuring-target point group in the current cycle is regarded as the same as the measuring-target point group in the previous cycle when the distance difference between the representative positions is Vs1*Δt(m), the difference between the representative relative velocities is within ±10(%) of the representative relative velocity in the current cycle, and the difference between the number of measuring-target points Mjk constituting the measuring-target point group in the current cycle and the number of measuring-target points Mjk constituting the measuring-target point group in the previous cycle is equal to or less than a reference number (prescribed natural number); and, when so regarded, there is incremented a number of detected times (by+1) which represents a number of times by which the identity of the measuring target-point group has been determined, where Vs1 represents a vehicle speed of the own vehicle in the current cycle, and Δt represents the control time slot TSj, i.e., the time interval from start to end of one control cycle. The reference number is: 1 when the number of measuring-target points Mjk constituting the measuring target-point group is 2; 2 when the latter number is 3; and a value of ±30(%) of the number of measuring-target points Mjk.

At step SB3, it is judged whether the number of times that the identity of each measuring-target point group has been determined (i.e., whether the identity has been continuously detected a prescribed number of times), has exceeded a prescribed value, and each measuring-target point group meeting this condition is regarded as a preceding vehicle. For any measuring-target point group in the previous cycle that has no identical measuring-target point group in the current cycle, the number of detected times is reset to zero. Upon a consecutive occurrence of such zero values of detected time number, the measuring-target point group may be deleted from the data.

FIG. 5 is a plan view describing an exemplary phase space recognized by the preceding-vehicle detecting apparatus 1 in the above-described process. The own vehicle V1 cruises at a vehicle speed VS1, and the preceding vehicles V2, V3 cruise at vehicle speeds VS2, VS3, respectively. Designated at reference character VRS2 is a relative velocity of the preceding vehicle V2 to own vehicle, and VRS3 is a relative velocity of the preceding vehicle V3 to own vehicle. Each measuring-target point Mjk is recognized as an intensity circle Cjk having its radius rjk representing an intensity I.

Namely, the preceding-vehicle detecting apparatus 1 comprises: a transmitting part for emitting scan waves in a forward direction of the vehicle; a receiving part for receiving reflected waves of the scan waves; a setter as a measuring-target-point setting part for setting measuring-target points based on the reflected waves; a calculator as a distance calculating part for calculating a distance from the own vehicle to each measuring-target point and the position of the measuring-target point, based on the reflected waves; another calculator as a distance-change calculating part for calculating changes between the distances in a previous cycle and those in a current cycle, respectively; another calculator as a relative-velocity calculating part for calculating a relative velocity of each measuring-target point with respect to the own vehicle, based on a change of the distance; a generator as a by-velocity group generating part for grouping the measuring-target points by relative velocities, thereby generating by-velocity groups; another generator as a measuring-target-point-group generating part for single-connecting measuring-target points with each other in each by-velocity group based on positions of the measuring-target points, thereby generating measuring-target point groups, respectively; an extractor as a measuring-target-point-group extracting part for extracting those measuring-target point groups among the measuring-target point groups, which meet the conditions for preceding vehicle, respectively; and a decider as a temporal continuity deciding part for regarding those measuring-target point groups as preceding vehicles, which have been extracted continuously more than a first prescribed number of times.

As a recognizer, a recognizing part is configured with the transmitting part, the receiving part, the measuring-target-point setting part, the distance calculating part, the distance-change calculating part, the relative-velocity calculating part, the by-velocity group generating part, the measuring-target-point-group generating part, and the measuring-target-point-group extracting part. The decider is configured with the temporal continuity judging part.

Figure 6:
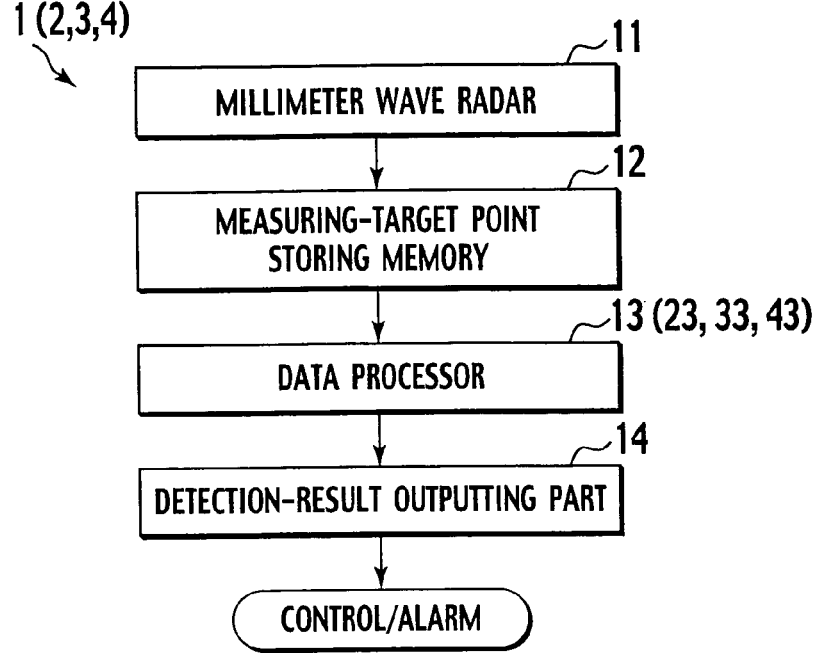
FIG. 6 is a block diagram of a preceding-vehicle detecting apparatus according to an embodiment of the invention.
Figure 7:
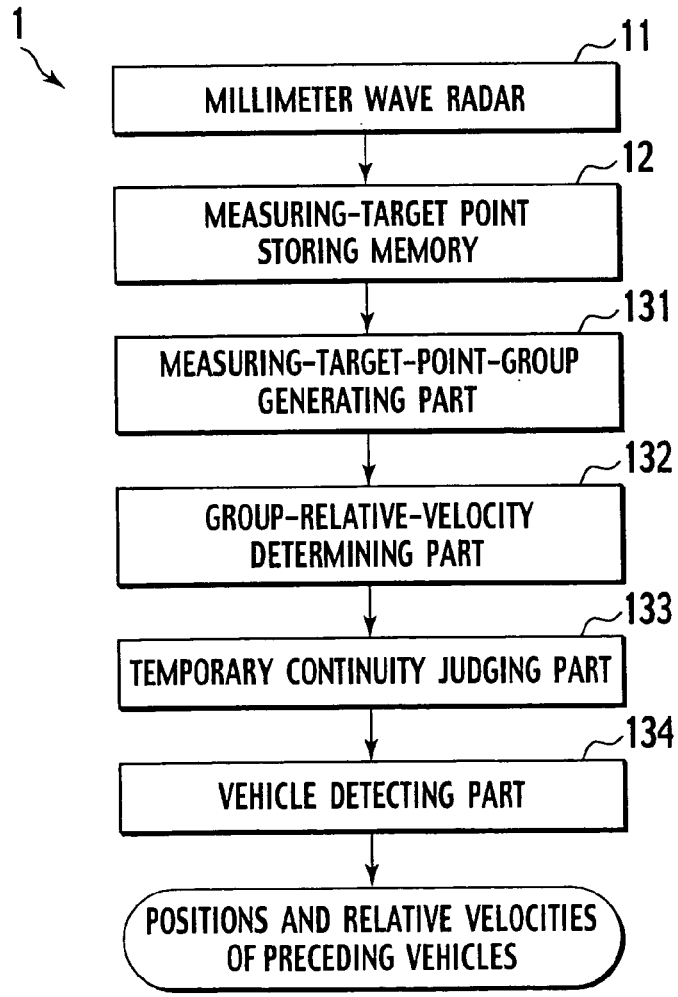
FIG. 7 is a block diagram of a preceding vehicle detecting apparatus according to another embodiment of the invention.
Figure 8A:
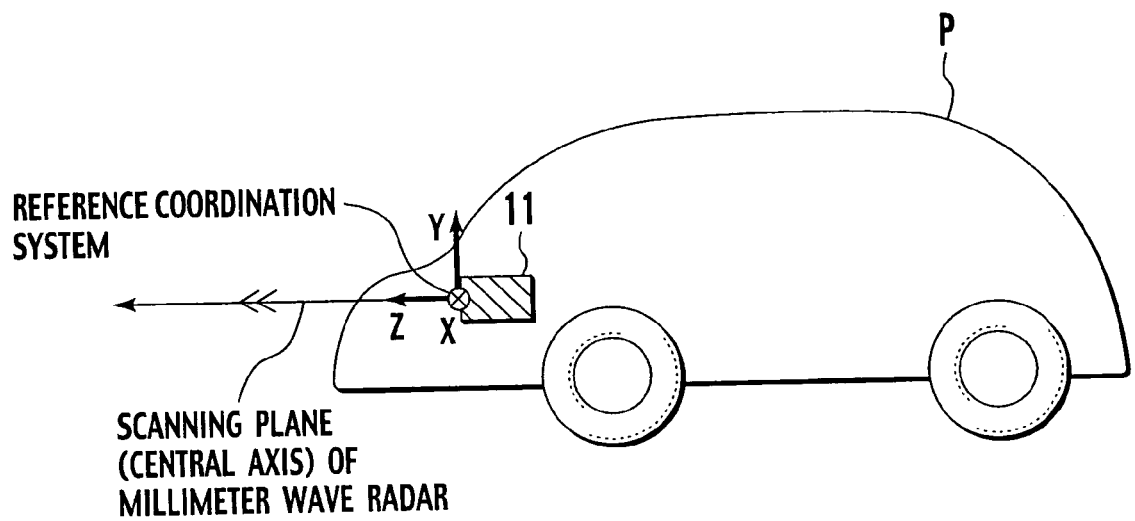
FIG. 8A and FIG. 8B are side and plan views of an own vehicle with a millimeter wave radar mounted in position.
Figure 8B:
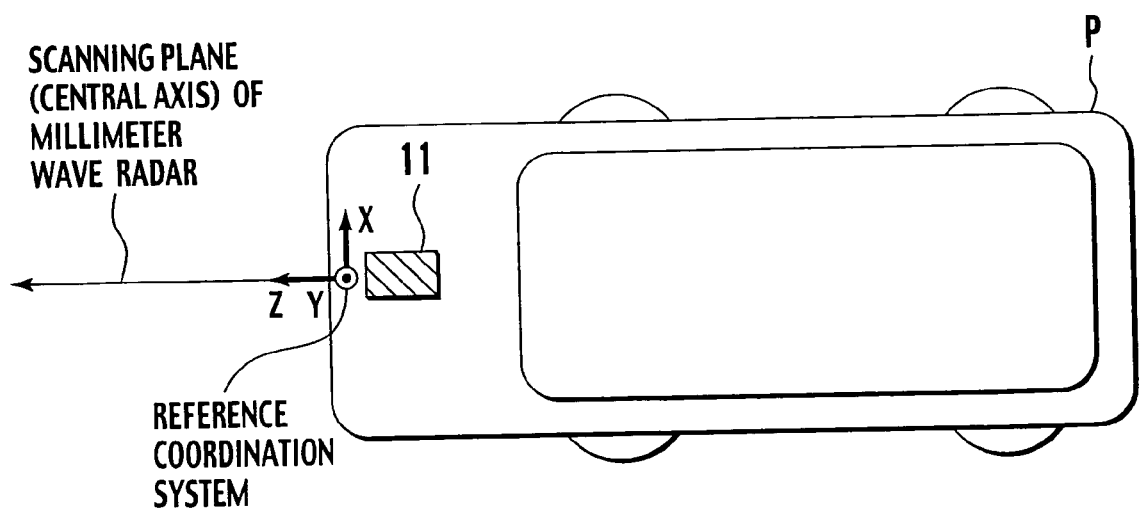
Figure 9:
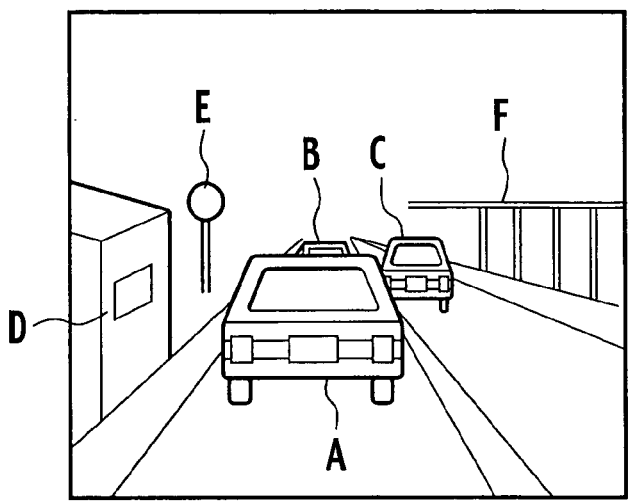
FIG. 9 is a frame of an exemplary front scene of an own vehicle.
Figure 10:
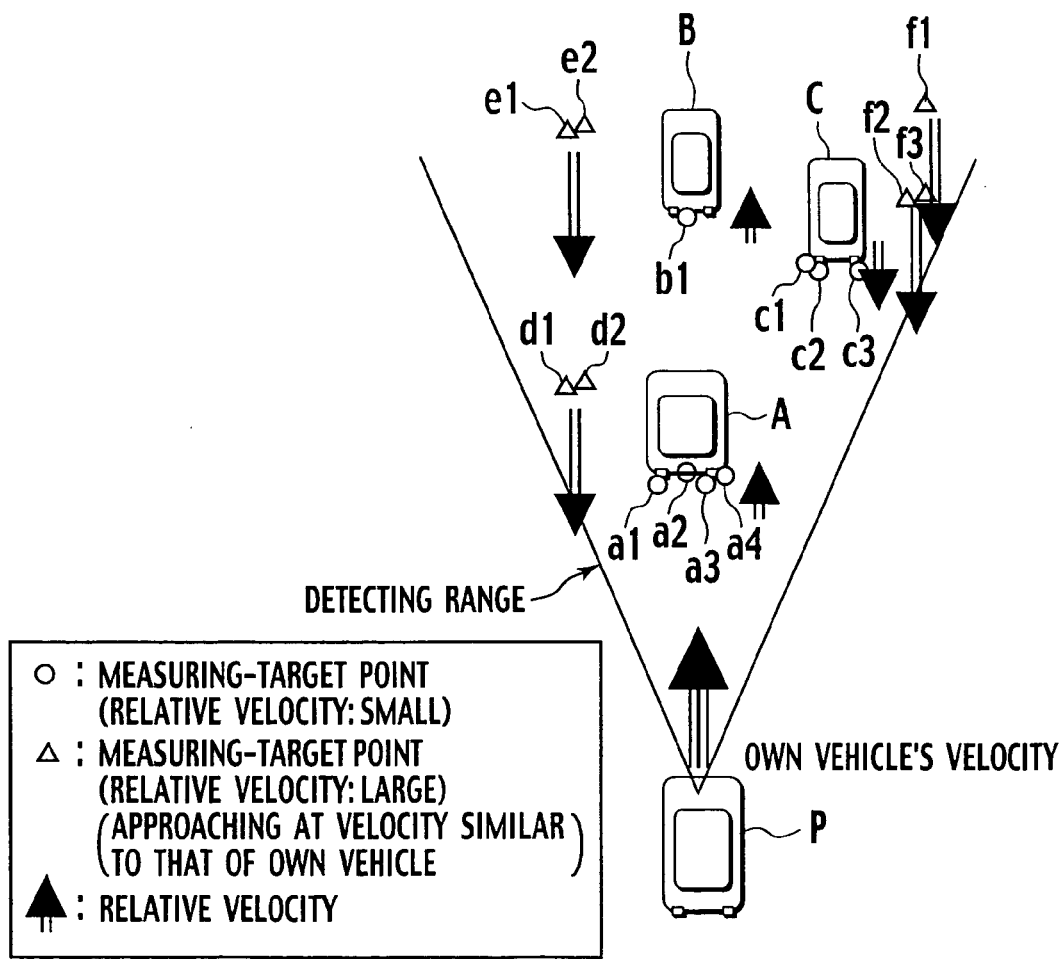
FIG. 10 is a plan view with an illustrative distribution of measuring-target points.
Figure 11:
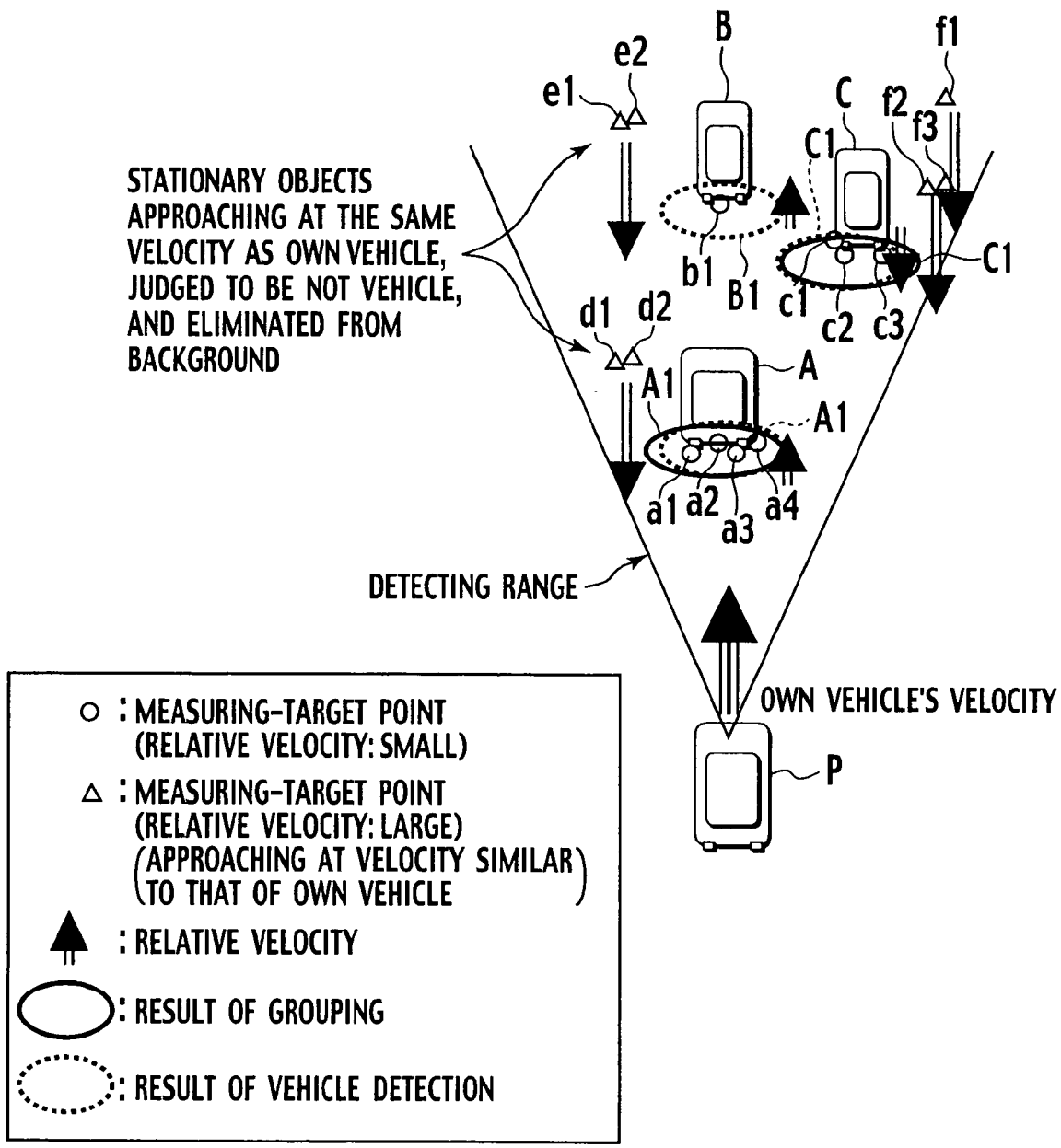
FIG. 11 is a plan view with distributed measuring-target points under process.

There will be described below the configuration of preceding-vehicle detecting apparatus 1 according to the first embodiment as well as main functions of constituent elements thereof, based on FIG. 6 through FIG. 11, in which FIG. 6 and FIG. 7 are block diagrams showing the configuration of the preceding-vehicle detecting apparatus 1, FIG. 8A and FIG. 8B are side and plan views showing a mounted position of the millimeter wave radar 11, FIG. 9 is an explanatory view showing a situation forward of an own vehicle P, and FIG. 10 and FIG. 11 are schematic plan views showing positions of measuring-target points, respectively. As used herein, the term "relative velocity" means a relative velocity of another vehicle relative to the own vehicle P in this first embodiment, as well as in second through tenth embodiments to be described later. FIGS. 10, 11, 14, 18, and 21 each show a synthesis of real space and phase space.

The preceding-vehicle detecting apparatus 1 is mounted on the own vehicle P, and comprises the millimeter wave radar 11, a measuring-target point storing memory 12, a data processor 13, and a provider as a detection-result outputting part 14. Further, as shown in FIG. 7, the data processor 13 comprises a measuring-target-point-group generating part 131, a determiner as a group-relative-velocity determining part 132, a temporal continuity judging part 133, and a detector as a vehicle detecting part 134.

The millimeter wave radar 11 is mounted on a front portion of the own vehicle P. The millimeter wave radar 11 emits millimeter waves (scan waves) in a forward direction of the own vehicle P, and receives reflected waves of the millimeter waves. Then, the measuring-target-point-group generating part 131 sets measuring-target points based on the received reflected waves, and calculates positions and relative velocities of the measuring-target points, respectively. The position of each measuring-target point is defined as a coordinate in a three-dimensional space fixed to the own vehicle P, which has: an origin located at a distal end portion of the millimeter wave radar 11; a Z-axis in the cruising direction of the own vehicle P; a Y-axis orthogonal to a road surface; and an X-axis orthogonal to the Z-axis and the Y-axis. Each relative velocity is calculated as a value assuming that the direction separating from the own vehicle P is a positive direction. Then, the measuring-target-point-group generating part 131 generates measuring-target-point data concerning the positions and relative velocities of the detected measuring-target points, respectively, and stores those data in the measuring-target point storing memory 12.

For preceding vehicles A through C, building D, road sign E and road sidewall F all ahead of the own vehicle P as shown in FIG. 9, there are set measuring-target points a1 to a4, b1, c1 to c3, d1 to d2, e1 to e2, and f1 to f3 based on reflected waves from the preceding vehicles A through C, building D, road sign E and road sidewall F as shown in FIG. 10, respectively. Although the preceding vehicle A is present between the own vehicle P and preceding vehicle B, the millimeter wave radar 11 receives reflected waves from the preceding vehicle B also, so that even the measuring-target point b1 corresponding to the preceding vehicle B is set. However, the number of measuring-target points corresponding to the preceding vehicle B is smaller than that of measuring-target points corresponding to other objects (such as preceding vehicle A). Next, the measuring-target-point-group generating part 131 calculates positions and relative velocities of the measuring-target points a1 to a4, b1, c1 to c3, d1 to d2, e1 to e2, and f1 to f3, and generates measuring-target-point data, respectively. Next, the generated measuring-target-point data are stored in the measuring-target point storing memory 12.

The measuring-target point storing memory 12 has data of various threshold values stored therein besides the measuring-target-point data.

The measuring-target-point-group generating part 131 acquires the measuring-target-point data from the measuring-target point storing memory 12, and generates measuring-target point groups based on the acquired measuring-target-point data (step SB1). There are generated measuring-target-point-group data associated with the measuring-target point groups, respectively, and output to the group-relative-velocity determining part 132.

In the exemplary situation shown in FIG. 10, the measuring-target-point-group generating part 131 generates a measuring-target point group A1 composed of measuring-target points a1 through a4, a measuring-target point group B1 of measuring-target point b1, and a measuring-target point group C1 of measuring-target points c1 through c3, as shown in FIG. 11. Then, measuring-target-point-group data associated with the generated measuring-target point groups A1 through C1 are generated, respectively, and output to the group-relative-velocity determining part 132.

The group-relative-velocity determining part 132 comprises a vehicle speed sensor (not shown), and detects a velocity of own vehicle P by the vehicle speed sensor. The determining part calculates relative velocities of measuring-target point groups from measuring-target-point-group data of the measuring-target-point-group generating part 131, respectively. The relative velocity of each measuring-target point group is calculated by averaging relative velocities of the measuring-target points constituting the measuring-target point group.

Based on calculated relative velocities, the group-relative-velocity determining part 132 extracts those from measuring-target point groups generated by the measuring-target-point-group generating part 131, which meet the conditions for preceding vehicle, respectively. The conditions for preceding vehicle in the first embodiment includes a relative velocity to be found within a reference velocity range β1. Further, the maximum value of the reference velocity range β1 is a positive value to be exemplarily obtained by multiplying the velocity of the own vehicle P by a prescribed ratio (such as 50(%)), while the minimum value is a negative value having the same absolute value as the maximum value.

Then, the group-relative-velocity determining part 132 generates extracted group data concerning the extracted measuring-target point groups, respectively, and stores those data in the measuring-target point storing memory 12.

For example, in the situation shown in FIG. 11, the group-relative-velocity determining part 132 calculates relative velocities of the measuring-target point groups A1 through C1, and extracts, based on calculated relative velocities, such measuring-target point groups A1 through C1 from the measuring-target point groups A1 through C1, that meet the conditions for preceding vehicle, respectively. Then, the group-relative-velocity determining part 132 generates extracted group data associated with thus extracted measuring-target point groups A1 through C1, and stores those data in the measuring-target point storing memory 12.

The temporal continuity judging part 133 acquires the extracted group data in the current cycle, from the measuring-target point storing memory 12. This judging part also acquires judgment data in the previous cycle, if such data are present. Then, the following procedures are conducted, based on the data.

Namely, the temporal continuity judging part 133 conducts an identity judgment (step SB2) between each measuring-target point group extracted in the current cycle and the corresponding measuring-target point group extracted in the previous cycle, based on the extracted group data in the current cycle and based on the corresponding judgment data in the previous cycle.

Meanwhile, the temporal continuity judging part 133 sets a prescribed value N1 for each measuring-target point group in a manner corresponding to the number of measuring-target points constituting the measuring-target point group in the current cycle, and conducts the procedure of step SB3.

In this way, the temporal continuity judging part 133 detects the preceding vehicles. Next, the temporal continuity judging part 133 incorporates the number of detected times and the judgment into the associated extracted group data in the current cycle to thereby generate each judgment data in the current cycle, and saves it into the measuring-target point storing memory 12.

Contrary, the temporal continuity judging part 133 judges those measuring-target point groups to be noises, which are not similar to measuring-target point groups in the current cycle and which are not judged to be preceding vehicles. Next, the temporal continuity judging part 133 incorporates each judgment into that associated judgment data in the previous cycle, which represents a noise, to thereby generate the judgment data in the current cycle, and the temporal continuity judging part 133 stores this data into the measuring-target point storing memory 12.

Further, the temporal continuity judging part 133 maintains, in the measuring-target point storing memory 12, judgment data in the previous cycle, concerning those measuring-target point groups in the previous cycle, which are not similar to measuring-target point groups in the current cycle but which are being judged as preceding vehicles, respectively.

Herein, the temporal continuity judging part 133 sets each prescribed value N1 as a larger value, for a smaller number of measuring-target points constituting the associated measuring-target point group in the current cycle. More specifically and exemplarily, the temporal continuity judging part 133 sets the prescribed value N1 to be 2 when the number of measuring-target points constituting the associated measuring-target point group in the current cycle is equal to or larger than a prescribed number (such as 2), and sets the prescribed value N1 to be 4 when the number of measuring-target points constituting the associated measuring-target point group in the current cycle is less than such a prescribed number. The reason of such a setment is that, smaller numbers of measuring-target points constituting measuring-target point groups lead to larger possibilities that the measuring-target point groups are noises.

For example, in the situation shown in FIG. 11, the temporal continuity judging part 133 regards the measuring-target point groups A1 and C1 as vehicles, respectively, when the number of detected times of each of the measuring-target point groups A1 and C1 is 2. Meanwhile, the measuring-target point group B1 is regarded as a vehicle, when the number of detected times of the measuring-target point group B1 becomes 4 or more. This is because, the possibility that the measuring-target point group B1 is a noise is larger than the possibility that the measuring-target point groups A1 and C1 are noises, respectively.

Meantime, the vehicle detecting part 134 acquires each judgment data in the current cycle from the measuring-target point storing memory 12, and generates a preceding-vehicle data concerning a position and relative velocity of a preceding vehicle, by treating: the representative position and representative relative velocity of the associated measuring-target point group having been regarded as the preceding vehicle; as the position and relative velocity of the preceding vehicle, respectively. Note that the Z-coordinate value of each preceding vehicle may be an average value of the maximum value and minimum value among Z-coordinate values of the measuring-target points corresponding to this preceding vehicle. Then, the vehicle detecting part 134 outputs the preceding-vehicle data, to the detection-result outputting part 14 shown in FIG. 6.

Note that the vehicle detecting part 134 may acquire each judgment data in the previous cycle from the measuring-target point storing memory 12, and may predict (calculate), based on the judgment data in the previous cycle, a position and relative velocity in the current cycle for the associated measuring-target point group having been previously judged to be a preceding vehicle. Such a prediction is conducted by calculating a curve representing a change of representative positions and a change of representative relative velocities of the measuring target-point group with the lapse of time, and by referring to such a curve. According to such a scheme, the vehicle detecting part 134 is allowed to precisely calculate the position and relative velocity of the pertinent preceding vehicle, even when it is difficult for the temporal continuity judging part 133 to precisely detect a preceding vehicle based on an extracted group data in the current cycle (such as when it is difficult for the temporal continuity judging part 133 to precisely update the number of detected times of an measuring target-point group, because the number of measuring-target points constituting this measuring-target point group in the current cycle has been rapidly reduced as compared with the number of measuring-target points constituting this measuring-target point group in the previous cycle). Note that, even when the vehicle detecting part 134 has calculated a position and relative velocity of a pertinent preceding vehicle by this scheme, the vehicle detecting part 134 generates a preceding-vehicle data concerning the thus calculated position and relative velocity of this preceding vehicle and outputs this data to the detection-result outputting part 14.

Based on the pertinent preceding-vehicle data provided by the vehicle detecting part 134, the detection-result outputting part 14 generates an own-vehicle controlling signal such as concerning controlling details (acceleration and/or deceleration, for example) for the own vehicle and presence/absence of alarm, and outputs this signal to an apparatus (such as an intervehicular distance controlling apparatus) which requires the own-vehicle controlling signal.

Next, the steps of process by the preceding-vehicle detecting apparatus 1 will be described, along with a flowchart shown in FIG. 12.

Figure 12:
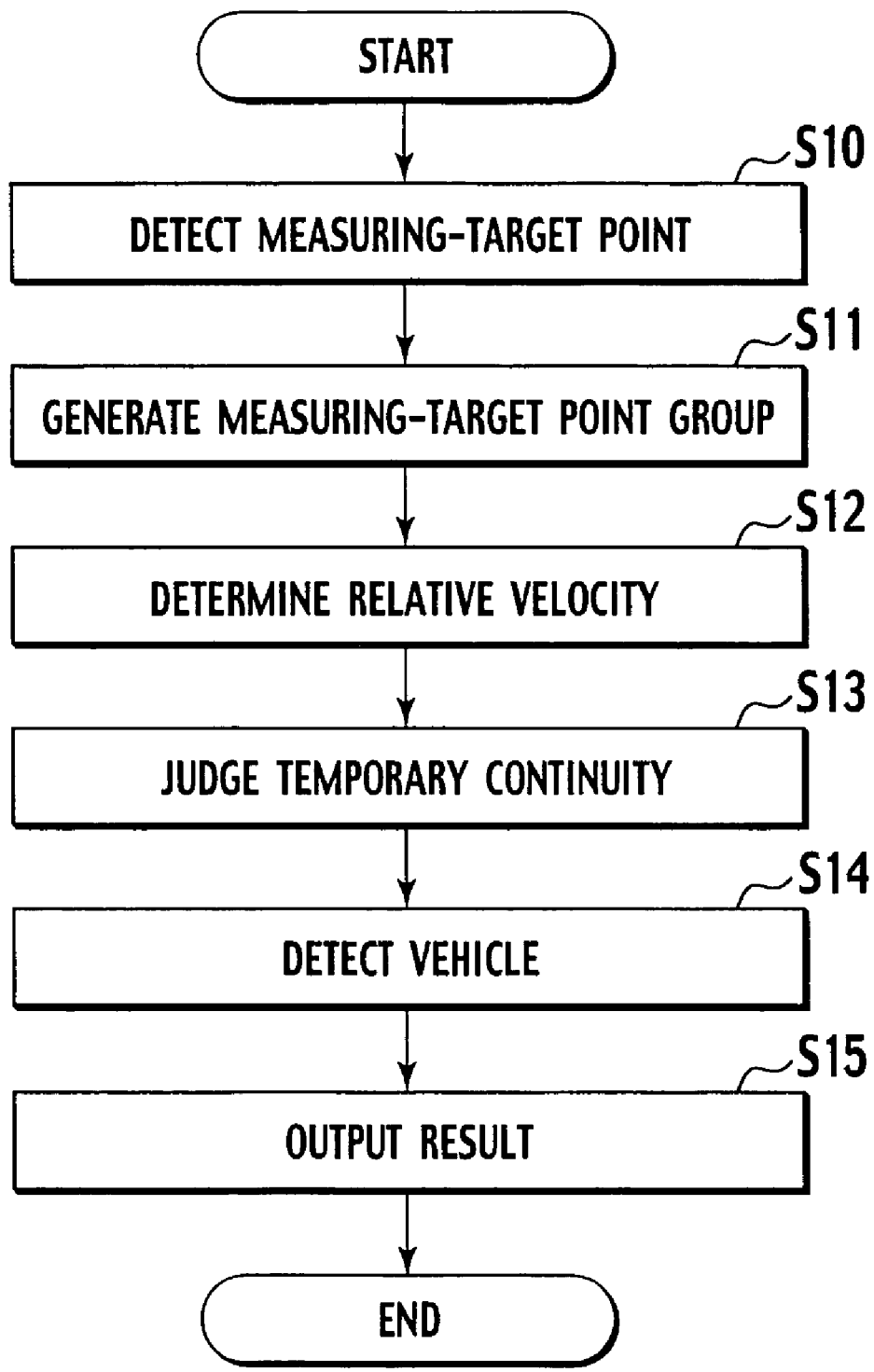
FIG. 12 is a flowchart of control actions of preceding-vehicle detecting apparatus.

At step S10 shown in FIG. 12, the millimeter wave radar 11 emits millimeter waves in a forward direction of the own vehicle P, and receives reflected waves of the millimeter waves. Then, the measuring-target-point-group generating part 131 sets measuring-target points based on the reflected waves, and calculates positions and relative velocities of the measuring-target points, respectively. Then, the measuring-target-point-group generating part 131 generates measuring-target-point data concerning the calculated positions and relative velocities of the measuring-target points, and stores those data in the measuring-target point storing memory 12.

Then, at step S11, the measuring-target-point-group generating part 131 acquires measuring-target-point data from the measuring-target point storing memory 12, and generates measuring-target point groups based on the acquired measuring-target-point data. Measuring-target-point-group data of the generated measuring-target point groups are generated and output to the group-relative-velocity determining part 132.

Then, at step S12, the group-relative-velocity determining part 132 calculates relative velocities of the measuring-target point groups based on the measuring-target-point-group data provided by the measuring-target-point-group generating part 131, respectively. Next, based on the calculated relative velocities, the group-relative-velocity determining part 132 extracts measuring-target point groups meeting the conditions for preceding vehicle, from the measuring-target point groups generated by the measuring-target-point-group generating part 131. Then, the group-relative-velocity determining part 132 generates extracted group data of thus extracted measuring-target point groups, and stores those data in the measuring-target point storing memory 12.

Then, at step S13, the temporal continuity judging part 133 acquires extracted group data in the current cycle, from the measuring-target point storing memory 12. Further, in case of presence of judgment data in the previous cycle, the temporal continuity judging part 133 also acquires the judgment data in the previous cycle to thereby generate judgment data in the current cycle based on the acquired data and by the above described procedures, and stores those data in the measuring-target point storing memory 12. In some cases, the judgment data in the previous cycle are held in the measuring-target point storing memory 12.

Next, at step S14, the vehicle detecting part 134 acquires the judgment data in the current cycle or the judgment data in the previous cycle from the measuring-target point storing memory 12, and based on the acquired judgment data, the vehicle detecting part 134 generates preceding-vehicle data and outputs those data to the detection-result outputting part 14 shown in FIG. 6.

Next, at step S15, the detection-result outputting part 14 generates own-vehicle controlling signals such as concerning controlling details of the own vehicle and presence/absence of alarm based on the preceding-vehicle data provided by the vehicle detecting part 134, and outputs those signals to respective apparatuses requiring the own-vehicle controlling signals.

In the above manner, the measuring-target-point-group generating part 131 generates the measuring-target point groups and the group-relative-velocity determining part 132 extracts those from the measuring-target point groups which meet the conditions for preceding vehicle, in this first embodiment. Then, the temporal continuity judging part 133 regards those measuring-target point groups as preceding vehicles, the number of detected times of each of which is equal to or greater than the prescribed value N1. Herein, when measuring-target point groups are noises, such measuring-target point groups are not detected many times even with the lapse of time. In the conventional, even such measuring-target point groups may not be eliminated by filters. Therefore, the preceding-vehicle detecting apparatus 1 is allowed to detect preceding vehicles after eliminating noises among the measuring-target point groups in a more ensured manner than the conventional, thereby making it possible to detect preceding vehicles in a more ensured manner than the conventional.

Further, even when the number of measuring-target points constituting a pertinent measuring-target point group is small, the preceding-vehicle detecting apparatus 1 does not immediately judge such a measuring-target point group as a noise, thus allowing an ensured detection of a preceding vehicle.

Moreover, since the preceding-vehicle detecting apparatus 1 utilizes the millimeter wave radar 11 to generate measuring-target point groups, the preceding-vehicle detecting apparatus 1 is capable of generating a measuring-target point group corresponding to a certain object and capable of judging whether or not the measuring-target point group is noise, even in case of presence of another object between the own vehicle P and such a certain object. Then, the preceding-vehicle detecting apparatus 1 is capable of regarding a measuring-target point group as a preceding vehicle in a certain case after conducting the judgment, thereby making it possible to ensuredly detect a certain vehicle even in case of presence of another object between the own vehicle P and such a certain object.

Further, the smaller the number of measuring-target points constituting the associated measuring-target point group, i.e., the greater the possibility that the measuring-target point group is a noise, the greater the prescribed value N1, thereby making it possible to eliminate noises in a more ensured manner than the conventional.

(Second Embodiment)

Figure 13:
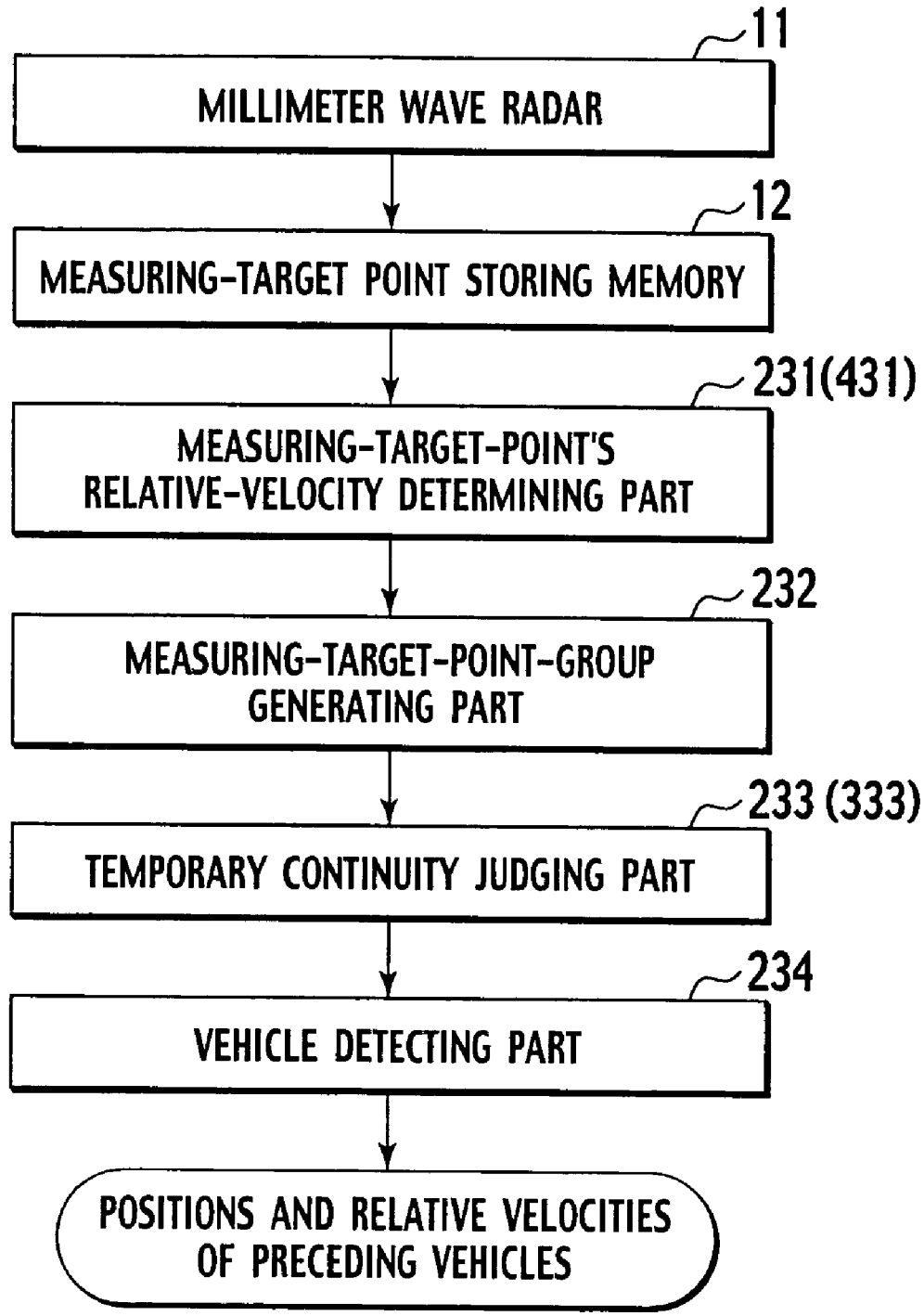
FIG. 13 is a functional block diagram describing a control flow of preceding-vehicle detecting apparatuses according to else embodiments of the invention.
Figure 14:
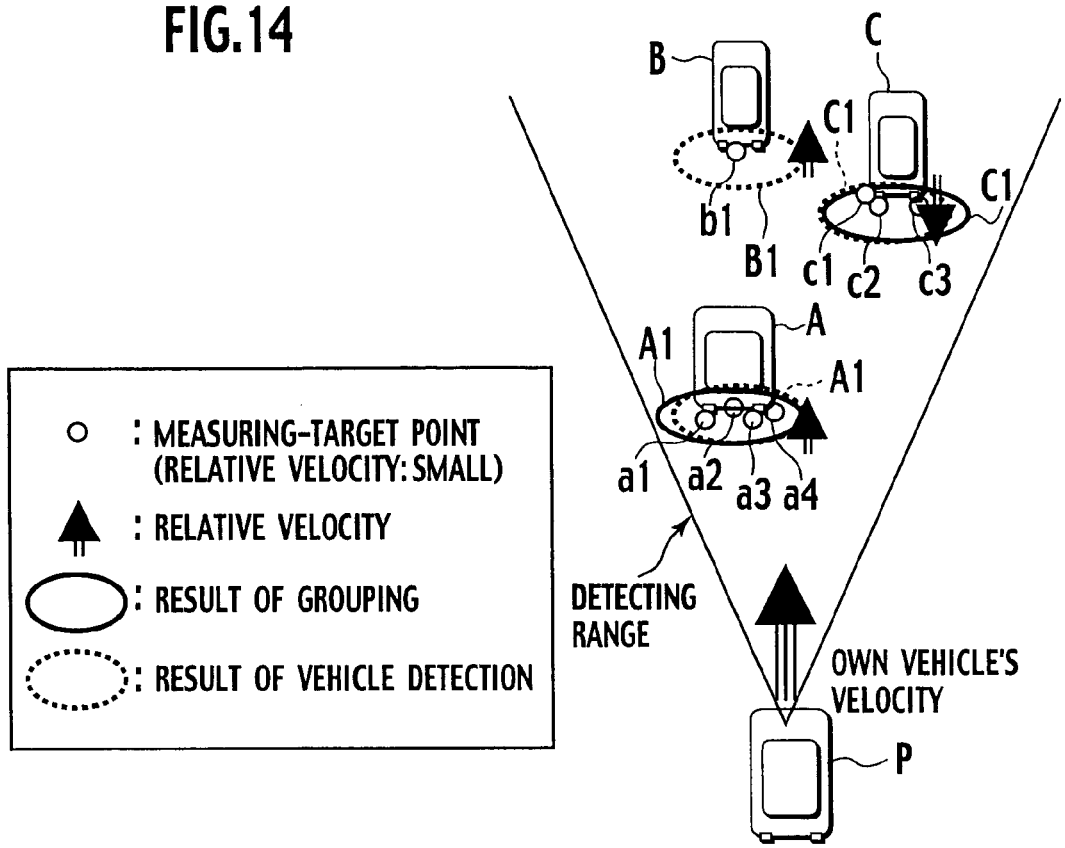
FIG. 14 is a plan view with an illustrative distribution of measuring-target points.

There will be described below a second embodiment of the present invention based on the drawings. There will be firstly described a configuration and constituent elements of a preceding-vehicle detecting apparatus 2 according to the second embodiment, with reference to FIG. 6, FIG. 8 through FIG. 10, FIG. 13 and FIG. 14. Here, FIG. 13 is a block diagram showing the configuration of the preceding-vehicle detecting apparatus 2, and FIG. 14 is a schematic plan view showing positions of measuring-target points.

As shown FIG. 6 and FIG. 8, the preceding-vehicle detecting apparatus 2 is mounted on an own vehicle P, and is provided by substituting the data processor 13 of the preceding-vehicle detecting apparatus 1 by a data processor 23. As shown in FIG. 13, the data processor 23 comprises a measuring-target-point relative-velocity determining part 231, a measuring-target-point-group generating part 232, a temporal continuity judging part 233, and a vehicle detecting part 234.

The measuring-target-point relative-velocity determining part 231 comprises a vehicle speed sensor (not shown), and this determining part detects a velocity of the own vehicle P by the vehicle speed sensor, generates measuring-target-point data by conducting the same procedures as the measuring-target-point-group generating part 131, and stores those data in a measuring-target point storing memory 12.

Further, the measuring-target-point relative-velocity determining part 231 acquires measuring-target-point data from the measuring-target point storing memory 12, and extracts, based on the acquired measuring-target-point data, those specific points from the measuring-target points which meet the conditions for preceding vehicle, respectively. Then, the measuring-target-point relative-velocity determining part 231 generates extracted measuring-target-point data concerning the specific points, and outputs those data to the measuring-target-point-group generating part 232.

Herein, the condition for a preceding vehicle is: to have a velocity similar to that of the own vehicle P, i.e., to have a relative velocity within the reference velocity range $\beta 1$, when the velocity of the own vehicle P is larger than an own vehicle reference velocity (30 (km/h), for example); and to have a relative velocity in the positive direction, when the velocity of the own vehicle P is at the own vehicle reference velocity or lower. Further, the maximum value of the reference velocity range $\beta 1$ is a positive value to be exemplarily obtained by multiplying the velocity of the own vehicle P by a prescribed ratio (such as 50(%)), while the minimum value is a negative value having the same absolute value as the maximum value. The conditions for preceding vehicle are set in the above manner, for the following reason. Namely, preceding vehicles typically cruise at substantially the same speeds as that of the own vehicle P. In view of this fact, the measuring-target-point relative-velocity determining part 231 is capable of extracting only those measuring-target points corresponding to preceding vehicles, respectively, by setting the conditions for preceding vehicle in the above manner when the velocity of the own vehicle P is larger than the own vehicle reference velocity.

As a situation where the velocity of the own vehicle P is smaller than the own vehicle reference velocity, it is conceivable that the own vehicle P is waiting at stoplights or the road is congested. In this case, there may be caused acceleration of a preceding vehicle before the own vehicle P is accelerated, and the velocity of the preceding vehicle becomes higher than that of the velocity of the own vehicle P in such a situation, so that the preceding vehicle is brought to have a relative velocity in the positive direction. Thus, the measuring-target-point relative-velocity determining part 231 is capable of extracting only those measuring-target points corresponding to preceding vehicles, respectively, by setting the conditions for preceding vehicle in the above manner when the velocity of the own vehicle P is at the own vehicle reference velocity or lower.

For example, in a situation shown in FIG. 9, there are set measuring-target points a1 to a4, b1, c1 to c3, d1 to d2, e1 to e2, and f1 to f3, based on reflected waves from the preceding vehicles A through C, building D, road sign E and road sidewall F as shown in FIG. 10. Under this condition, the measuring-target-point relative-velocity determining part 231 extracts specific points a1 to a4, b1, and c1 to c3 from the measuring-target points a1 to a4, b1, c1 to c3, d1 to d2, e1 to e2, and f1 to f3, as shown in FIG. 14. Then, the measuring-target-point relative-velocity determining part 231 generates extracted measuring-target-point data concerning the specific points a1 to a4, b1, and c1 to c3, and outputs those data to the measuring-target-point-group generating part 232.

The measuring-target-point-group generating part 232 generates measuring-target point groups from the specific points only, based on the extracted measuring-target-point data provided by the measuring-target-point relative-velocity determining part 231. Then, the measuring-target-point-group generating part 232 generates extracted group data concerning the generated measuring-target point groups and stores those data in the measuring-target point storing memory 12, in the same manner as the group-relative-velocity determining part 132. Note that, since only the specific points are subjected to the generation of measuring-target point groups by the measuring-target-point-group generating part 232, this measuring-target-point-group generating part 232 is capable of conducting the same procedure as the group-relative-velocity determining part 132 according to the first embodiment, by simply generating the measuring-target point groups.

For example, in the situation shown in FIG. 14, the measuring-target-point-group generating part 232 generates a measuring-target point group A1 configured with the specific points a1 through a4, a measuring-target point group B1 configured with the specific point b1, and a measuring-target point group C1 configured with the specific points c1 through c3. Then, the measuring-target-point-group generating part 232 generates extracted group data concerning the generated measuring-target point groups A1 through C1, and stores those data in the measuring-target point storing memory 12.

The temporal continuity judging part 233 and vehicle detecting part 234 conduct the same procedures as the first embodiment.

Next, there will be described below steps of process by the preceding-vehicle detecting apparatus 2, along with a flowchart shown in FIG. 15.

Figure 15:
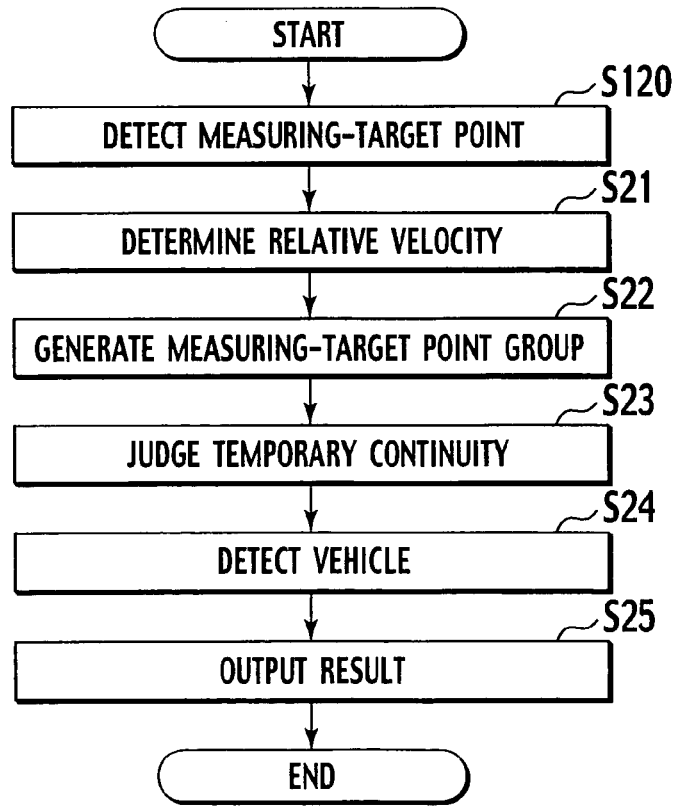
FIG. 15 is a flowchart of control actions of preceding-vehicle detecting apparatus.

At step S20 shown in FIG. 15, the millimeter wave radar 11 emits millimeter waves and receives reflected waves. Then, the measuring-target-point relative-velocity determining part 231 sets measuring-target points based on the reflected waves, and calculates positions and relative velocities of the measuring-target points, respectively. Then, the measuring-target-point relative-velocity determining part 231 generates measuring-target-point data concerning the positions and relative velocities of the measuring-target points, and stores those data in the measuring-target point storing memory 12.

Next, at step S21, the measuring-target-point relative-velocity determining part 231 detects the velocity of the own vehicle P. Then, the measuring-target-point relative-velocity determining part 231 acquires the measuring-target-point data from the measuring-target point storing memory 12, and extracts those specific points from the measuring-target points which meet the conditions for preceding vehicle, based on the acquired measuring-target-point data and based on the detected velocity of the own vehicle P. Then, the measuring-target-point relative-velocity determining part 231 generates extracted measuring-target-point data concerning the specific points, and outputs those data to the measuring-target-point-group generating part 232.

Then, at step S22, the measuring-target-point-group generating part 232 generates measuring-target point groups from the specific points only, based on the extracted measuring-target-point data provided by the measuring-target-point relative-velocity determining part 231. Then, the measuring-target-point-group generating part 232 generates extracted group data concerning the generated measuring-target point groups, and stores those data in the measuring-target point storing memory 12.

Next, at step S23 through step S25, there are conducted the same procedures as the step S13 through step S15.

In the above manner, the measuring-target-point-group generating part 232 is capable of generating measuring-target point groups corresponding to the preceding vehicles, by simply generating measuring-target point groups, according to the second embodiment. Thus, the procedures at step S22 onward are simplified than those procedures at step S12 onward, thereby allowing the preceding-vehicle detecting apparatus 2 to detect preceding vehicles in a more effective manner than the preceding-vehicle detecting apparatus 1. Note that the conditions for preceding vehicle in the second embodiment may be applied to other embodiments.

(Third Embodiment)

Figure 16:
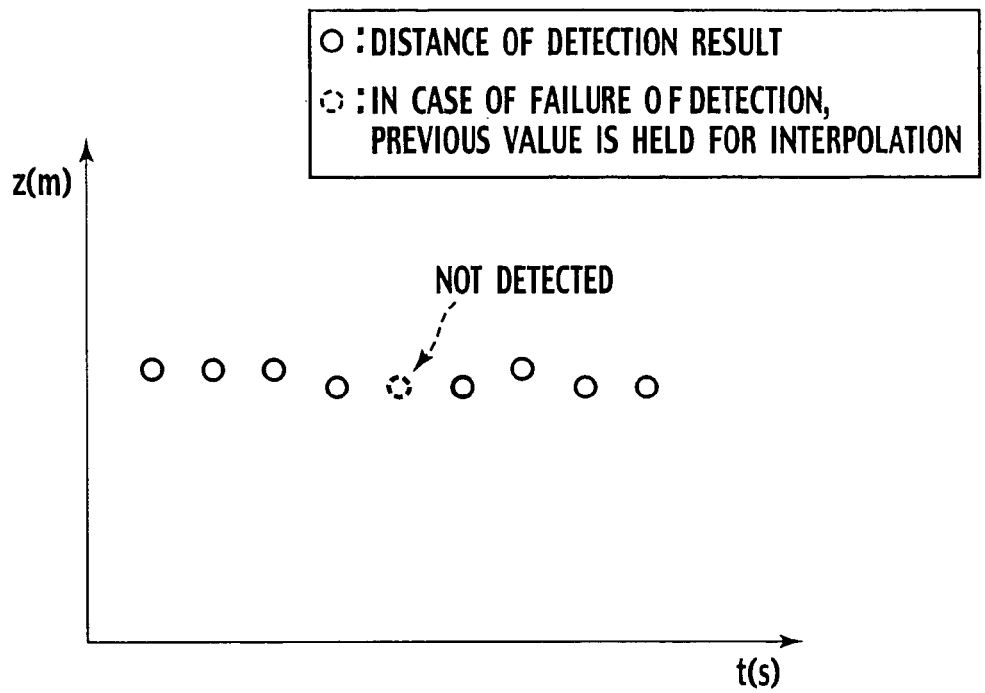
FIG. 16 is a time chart describing an exemplary process for detection of a measuring-target point group.
Figure 17:
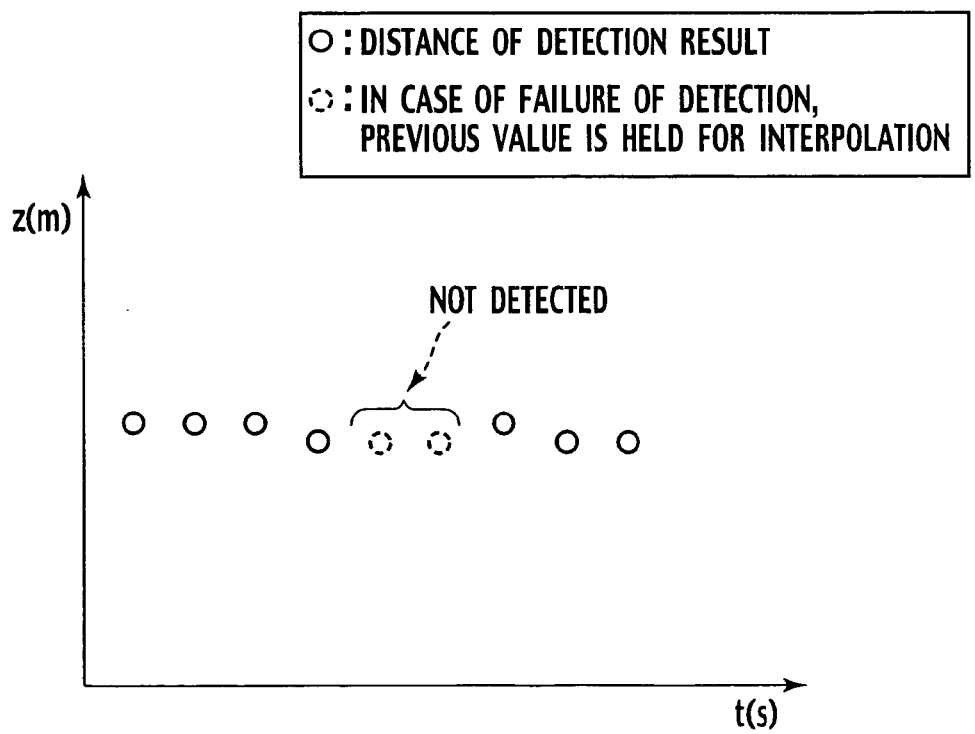
FIG. 17 is a time chart describing another exemplary process for detection of a measuring-target point group.

There will be described below a third embodiment of the present invention based on the drawings. There will be firstly described a configuration and constituent elements of a preceding-vehicle detecting apparatus 3 according to the third embodiment, with reference to FIG. 6, FIG. 8, FIG. 13 and FIG. 16 through FIG. 17. Here, FIG. 13 is a block diagram showing the configuration of the preceding-vehicle detecting apparatus 3, and FIG. 16 through FIG. 17 are graphs each showing a relationship between: a time point (abscissa); and a Z-coordinate value of a pertinent measuring-target point group detected at each time point.

As shown FIG. 6 and FIG. 8, the preceding-vehicle detecting apparatus 3 is mounted on an own vehicle P, and is provided by substituting the data processor 23 of the preceding-vehicle detecting apparatus 2 by a data processor 33. As shown in FIG. 13, the data processor 33 is provided by substituting the temporal continuity judging part 233 of the data processor 23 by a temporal continuity judging part 333.

The temporal continuity judging part 333 conducts: the same procedure as the temporal continuity judging part 133, in case of presence of the same measuring-target point groups in the current cycle, as those measuring-target point groups in the previous cycle; and the following procedures, in case of absence of the same measuring-target point groups in the current cycle, as those measuring-target point groups in the previous cycle.

Namely, the temporal continuity judging part 333 judges whether a pertinent judgment data in the previous cycle includes a number of detection-failure times (its initial value is 1). From this result, when the number of detection-failure times is not included in the judgment data in the previous cycle, the temporal continuity judging part 333 incorporates the initial value of the number of detection-failure times into the judgment data in the previous cycle, and increments the number of detected times of the judgment data in the previous cycle by 1, thereby generating an extracted group data in the current cycle. Meantime, when the number of detection-failure times is included in the judgment data in the previous cycle, the temporal continuity judging part 333 increments the number of detected times of the judgment data in the previous cycle by 1. Thereafter, when the number of detection-failure times after increment is equal to or less than a prescribed value N2, the temporal continuity judging part 333 increments both the number of detection-failure times and the number of detected times in the previous cycle by 1, and treats them as the extracted group data in the current cycle. Meantime, the temporal continuity judging part 333 judges those measuring-target point groups in the previous cycle to be noises, the number of detection-failure times after the above described increment of each of which groups exceeds the prescribed value N2 and which groups have not been judged to be preceding vehicles, respectively. Then, the temporal continuity judging part 333 incorporates the judgment into the pertinent judgment data in the previous cycle to thereby generate a judgment data in the current cycle, and stores this data into the measuring-target point storing memory 12. Further, the temporal continuity judging part 333 maintains: judgment data of those measuring-target point groups in the previous cycle, the number of detection-failure times after the increment of each of which groups exceeds the prescribed value N2 and which groups have been judged to be preceding vehicles, respectively; in the measuring-target point storing memory 12.

In this way, the temporal continuity judging part 333 estimates that the pertinent measuring-target point group has been continuously extracted that number of times which is equal to or less than the prescribed value N2, even when the measuring-target point group has not been extracted that number of times which is equal to or less than the prescribed value N2.

Then, the temporal continuity judging part 333 conducts the same procedure as the temporal continuity judging part 133 concerning the pertinent extracted group data in the current cycle to thereby judge whether the measuring-target point group in the current cycle is a preceding vehicle or not; and the temporal continuity judging part 333 incorporates the associated number of detected times and the associated judgment into the extracted group data in the current cycle to thereby generate a judgment data, and stores this judgment data into the measuring-target point storing memory 12.

Herein, the temporal continuity judging part 333 sets each prescribed value N2 as a larger value, for a smaller number of measuring-target points constituting the associated measuring-target point group, and for a larger number of detected times of the associated measuring-target point group. This is because, the smaller the number of measuring-target points constituting the pertinent measuring-target point group, the easier the measuring-target point group is lost. Meantime, even when the pertinent measuring-target point group is a noise, there is a possibility that such a measuring-target point group is not judged to be a noise, insofar as the prescribed value N2 is simply set at a larger value for a smaller number of measuring-target points constituting the measuring-target point group. As such, the prescribed value N2 is set at a larger value for a larger number of detected times of the measuring target-point group. In this way, the temporal continuity judging part 333 is allowed to ensuredly judge: a measuring-target point group corresponding to a noise, i.e., a measuring-target point group having a smaller number of detected times; to be a noise.

FIG. 16 through FIG. 17 show an example of process by the temporal continuity judging part 333. Note that the measuring-target point group shown in FIG. 16 shall include measuring-target points more than those of the measuring-target point group shown in FIG. 17. Thus, the prescribed value N2 for FIG. 16 is larger than the prescribed value N2 for FIG. 17. As shown in FIG. 16 through FIG. 17, the temporal continuity judging part 333 estimates that the pertinent measuring-target point group has been continuously extracted that number of times which is equal to or less than the prescribed value N2, even when the measuring-target point group has not been extracted that number of times which is equal to or less than the prescribed value N2.

The steps of process to be conducted by the preceding-vehicle detecting apparatus 3 are the same as those to be conducted by the preceding-vehicle detecting apparatus 2, so that the explanation thereof shall be omitted.

In the above manner, the preceding-vehicle detecting apparatus 3 in the third embodiment estimates that the pertinent measuring-target point group has been continuously extracted that number of times which is equal to or less than the prescribed value N2, even when the measuring-target point group has not been continuously extracted that number of times which is equal to or less than the prescribed value N2. Thus, the preceding-vehicle detecting apparatus 3 is allowed to estimate that a measuring-target point group, which has not been extracted (i.e., has been lost) by some reason though the measuring-target point group is present within a detecting range of the millimeter wave radar 11, is extracted; thereby making it possible to stably extract measuring-target point groups. This allows to stably detect preceding vehicles. Further, the preceding-vehicle detecting apparatus 3 sets each prescribed value N2 as a larger value, for a smaller number of measuring-target points constituting the associated measuring-target point group, and for a larger number of detected times of the associated measuring-target point group, so that the preceding-vehicle detecting apparatus 3 is capable of stably extracting measuring-target point groups even when the measuring-target point groups are apt to be lost. Further, the preceding-vehicle detecting apparatus 3 is capable of ensuredly judging a pertinent measuring-target point group to be a noise, if it is the case.

(Fourth Embodiment)

Figure 18:
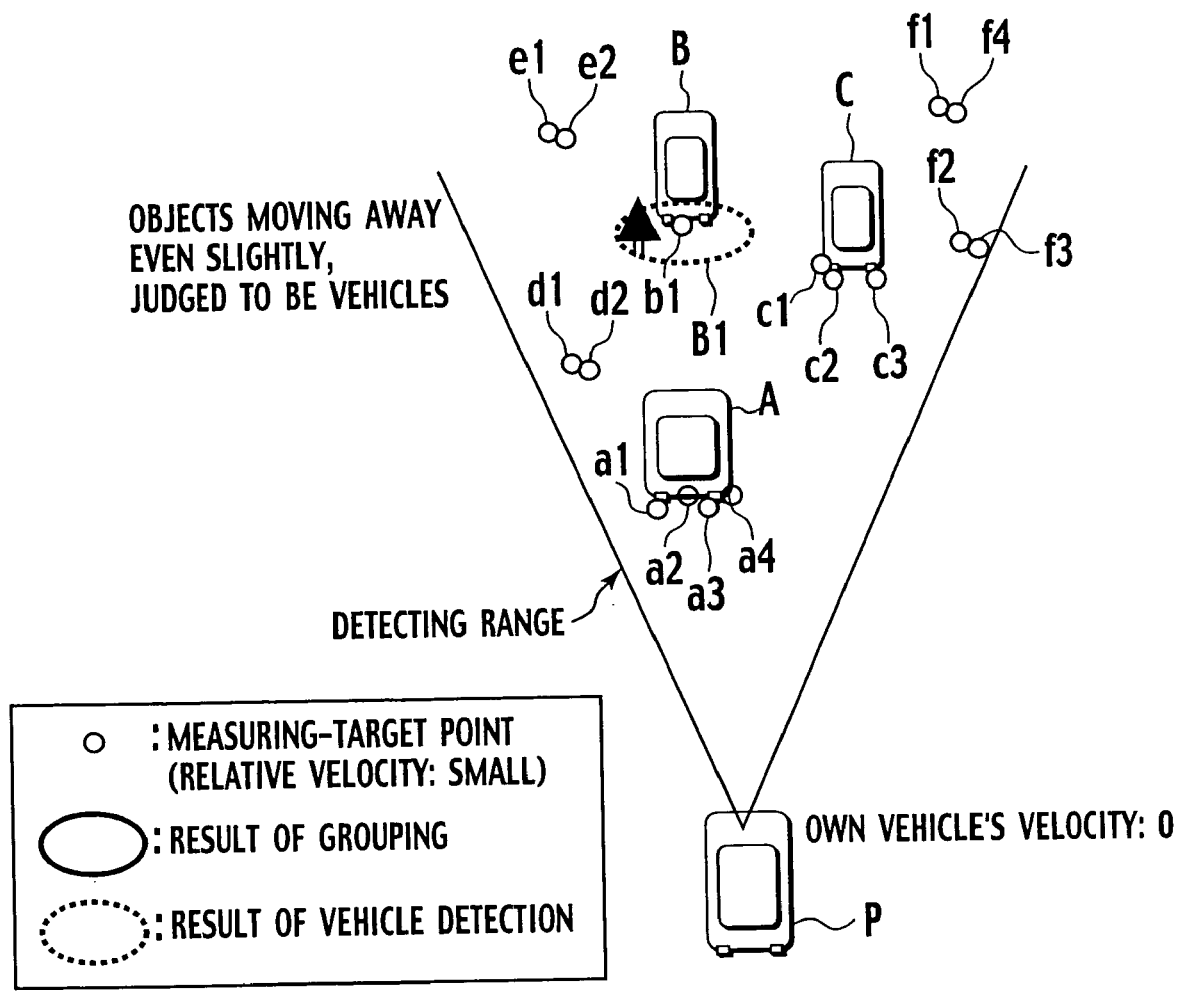
FIG. 18 is a plan view with an illustrative distribution of measuring-target points.

There will be described below a fourth embodiment of the present invention based on the drawings. There will be firstly described a configuration and constituent elements of a preceding-vehicle detecting apparatus 4 according to the fourth embodiment, with reference to FIG. 6, FIG. 8, FIG. 13 and FIG. 18. Here, FIG. 13 is a block diagram showing the configuration of the preceding-vehicle detecting apparatus 4, and FIG. 18 is a schematic plan view showing positions of measuring-target points.

As shown in FIG. 6 and FIG. 8, the preceding-vehicle detecting apparatus 4 is mounted on an own vehicle P, and is provided by substituting the data processor 33 of the preceding-vehicle detecting apparatus 3 by a data processor 43. As shown in FIG. 13, the data processor 43 is provided by substituting the measuring-target-point relative-velocity determining part 231 of the data processor 33 by a measuring-target-point relative-velocity determining part 431.

The measuring-target-point relative-velocity determining part 431 comprises a vehicle speed sensor (not shown), detects a velocity of the own vehicle P by the vehicle speed sensor, conducts the same procedure as the measuring-target-point-group generating part 131, generates measuring-target-point data, and stores those data in the measuring-target point storing memory 12.

Further, the measuring-target-point relative-velocity determining part 431 acquires the measuring-target-point data from the measuring-target point storing memory 12, and extracts, based on the acquired measuring-target-point data, those specific points from the measuring-target points which meet the conditions for preceding vehicle. Then, the measuring-target-point relative-velocity determining part 431 generates extracted measuring-target-point data concerning the specific points, respectively, and outputs those data to the measuring-target-point-group generating part 232.

Here, the condition for a preceding vehicle is to have a relative velocity in the positive direction when the velocity of the own vehicle P is zero, i.e., when the own vehicle P is stopped, and otherwise, this condition is the same as the condition for a preceding vehicle noted in the second embodiment. The conditions for preceding vehicle are set in the above manner, for the following reason. Namely, preceding vehicles typically cruise at substantially the same speeds as that of the own vehicle P. Thus, the preceding vehicles are often stopped when the own vehicle P is stopped (such as when the own vehicle P is waiting at stoplights or the road is congested). In this case, the pertinent preceding vehicle is sometimes started before the own vehicle P is started, and then the velocity of the started preceding vehicle becomes higher than that of the own vehicle P so that the preceding vehicle is brought to have a relative velocity in the positive direction. Thus, the condition for a preceding vehicle is set in the above manner for the situation where the own vehicle P is stopped, so that the measuring-target-point relative-velocity determining part 431 is enabled to extract measuring-target points corresponding to preceding vehicles.

For example, in case of a situation forward of the own vehicle P shown in FIG. 9 where the own vehicle P is stopped, there are set measuring-target points a1 to a4, b1, c1 to c3, d1 to d2, e1 to e2, and f1 to f4 based on reflected waves from preceding vehicles A through C, building D, road sign E and road sidewall F as shown in FIG. 18. Under this condition, the measuring-target-point relative-velocity determining part 431 extracts a specific point b1 having a relative velocity in the positive direction, from the measuring-target points a1 to a4, b1, c1 to c3, d1 to d2, e1 to e2, and f1 to f4, as shown in FIG. 18. Next, the measuring-target-point relative-velocity determining part 431 generates an extracted measuring-target-point data concerning the specific point b1, and outputs this data to the measuring-target-point-group generating part 232.

The steps of process to be conducted by the preceding-vehicle detecting apparatus 4 are the same as those to be conducted by the preceding-vehicle detecting apparatus 2, so that the explanation thereof shall be omitted.

Based on the above and according to the fourth embodiment, the preceding-vehicle detecting apparatus 4 is allowed to detect preceding vehicles more ensuredly than the conventional. Particularly, the preceding-vehicle detecting apparatus 4 is allowed to detect preceding vehicles which have started while the own vehicle P is stopped, more ensuredly than the conventional. Note that the conditions for preceding vehicle suggested in the fourth embodiment may be applied to other embodiments.

(Fifth Embodiment)

There will be described below a fifth embodiment of the present invention based on the drawings. There will be firstly described a configuration and constituent elements of an own-vehicle controlling apparatus 5 according to the fifth embodiment, with reference to FIG. 8, FIG. 13, and FIG. 19. Here, FIG. 19 is a block diagram showing the configuration of the own-vehicle controlling apparatus 5.

Figure 19:
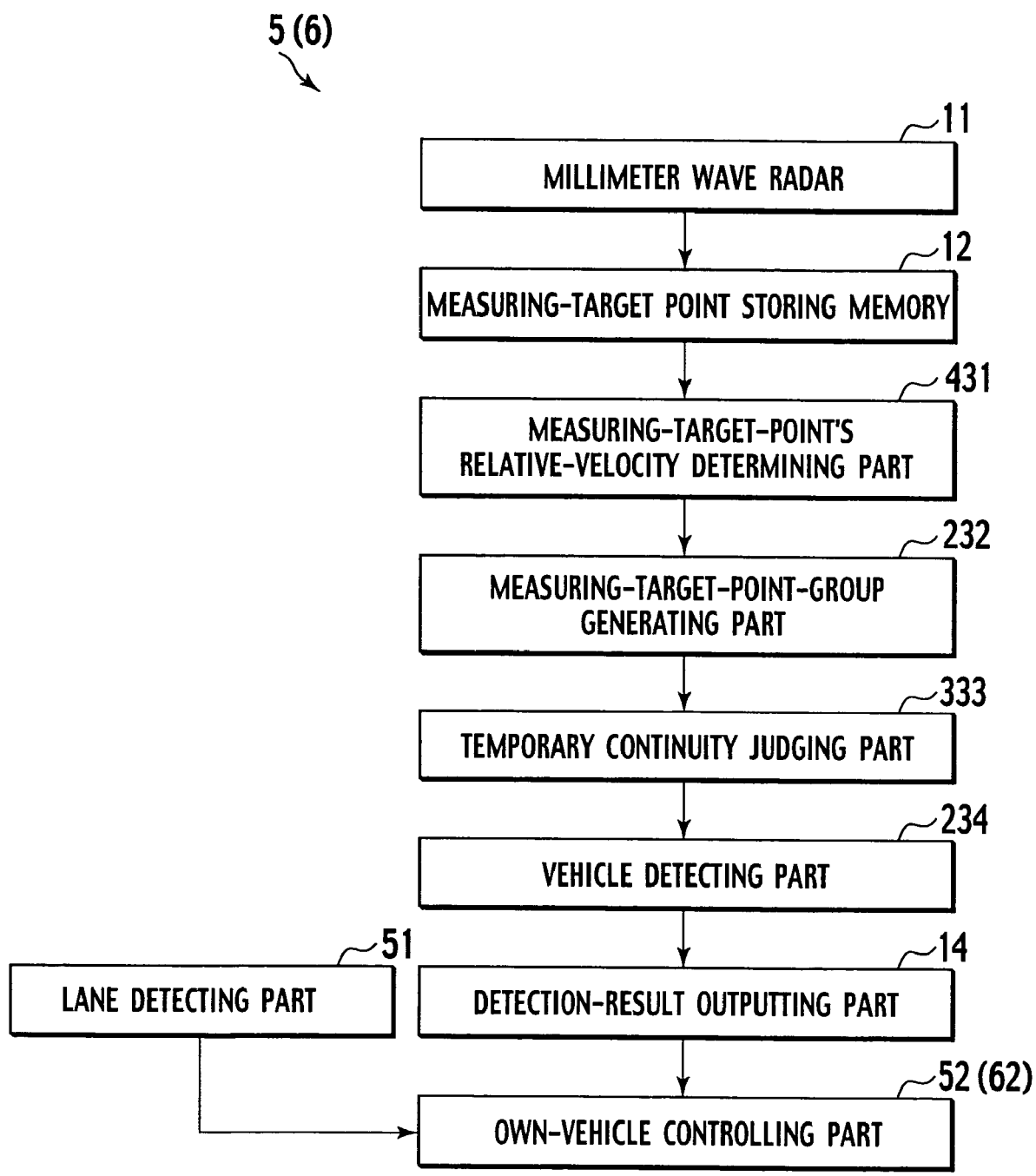
FIG. 19 is a functional block diagram describing a control flow of preceding-vehicle detecting apparatuses according to still further embodiments of the invention.

As shown in FIG. 8, FIG. 13 and FIG. 19, the own-vehicle controlling apparatus 5 is mounted on an own vehicle P, and is achieved by providing the preceding-vehicle detecting apparatus 4 with a lane detecting part 51 and an own-vehicle controlling part 52.

The lane detecting part 51 comprises a camera (not shown), and captures an image forward of the own vehicle P by the camera. Then, the lane detecting part 51 conducts white-line detection process and the like based on the captured image, thereby detecting a lane on which the own vehicle P is to cruise, i.e., the own lane. Then, the lane detecting part 51 generates an own-lane signal concerning the own lane, and outputs it to the own-vehicle controlling part 52. Note that it is possible to provide a gyro sensor for the lane detecting part 51 instead of the camera, and to cause the lane detecting part 51 to detect the own lane based on the signal from the gyro sensor.

The own-vehicle controlling part 52 acquires judgment data from the measuring-target point storing memory 12. Then, the own-vehicle controlling part 52 conducts the following procedure based on the judgment data, the own-vehicle controlling signals provided by the detection-result outputting part 14, and the own-lane signal provided by the lane detecting part 51. Namely, the own-vehicle controlling part 52 judges whether a first preceding vehicle is present on the own lane or not. Based on the result therefrom, when the first preceding vehicle is present on the own lane, the own-vehicle controlling part 52 further judges whether a second or another preceding vehicle is present between the first preceding vehicle and the own vehicle P or not. Based on the result therefrom, when the second preceding vehicle is present, the own-vehicle controlling part 52 judges whether the first preceding vehicle has a relative velocity equal to or less than a prescribed reference velocity (such as −30(km/h)) or not. Based on the result therefrom, when the relative velocity of the first preceding vehicle becomes equal to or less than the reference velocity, the own-vehicle controlling part 52 decelerates the own vehicle P or conducts preparation for deceleration thereof. More specifically, braking control or shift-down is conducted for the own vehicle P, for example.

There will be described below steps of process to be conducted by the own-vehicle controlling apparatus 5. Firstly, the own-vehicle controlling apparatus 5 conducts the same procedures as the preceding-vehicle detecting apparatus 4. This causes the detection-result outputting part 14 to output own-vehicle controlling signals to the own-vehicle controlling part 52. Meantime, the lane detecting part 51 detects the own lane, generates a lane signal concerning the detected own lane, and outputs the signal to the own-vehicle controlling part 52. Then, the own-vehicle controlling part 52 acquires the judgment data from the measuring-target point storing memory 12, and decelerates the own vehicle P or conducts preparation for deceleration thereof by the above procedure in a certain case based on: the acquired judgment data; the own-vehicle controlling signals provided by the detection-result outputting part 14; and the own-lane signal provided by the lane detecting part 51.

In the above manner, the own-vehicle controlling apparatus 5 according to the fifth embodiment conducts the cruising control of the own vehicle correspondingly to the running state of a first preceding vehicle, when the first preceding vehicle is present on the own lane and a second preceding vehicle is present between the first preceding vehicle and the own vehicle P. This enables to early start the cruising control for the own vehicle. For example, the second preceding vehicle cruises correspondingly to the running state of the first preceding vehicle (for example, the second preceding vehicle stops when the first preceding vehicle has stopped), so that the own-vehicle controlling apparatus 5 is enabled to early start the cruising control correspondingly to the running state of the second preceding vehicle.

More specifically, the own-vehicle controlling apparatus 5 decelerates the own vehicle P or conducts preparation for deceleration thereof, when the first preceding vehicle is present on the own lane, a second preceding vehicle is present between the first preceding vehicle and the own vehicle P, and the relative velocity of the first preceding vehicle becomes equal to or less than the prescribed reference velocity. Thus, the own-vehicle controlling apparatus 5 is enabled to decelerate the own vehicle P or conduct preparation for deceleration thereof before the second preceding vehicle starts its deceleration, so that the own-vehicle controlling apparatus 5 is enabled to smoothly decelerate the own vehicle P when the second preceding vehicle has started its deceleration. This makes it possible to maintain an appropriate intervehicular distance between the own vehicle P and the second preceding vehicle, even when the first preceding vehicle has decelerated.

Note that it is possible to provide the own-vehicle controlling apparatus 5 with a weather judging apparatus for judging the weather around the own vehicle P, and to cause the own-vehicle controlling part 52 to decelerate the own vehicle P or conduct preparation for deceleration thereof based on the judgment data, the own-vehicle controlling signals and the own-lane signal as well as the content of a signal to be output from the weather judging apparatus. In this case, the own-vehicle controlling part 52 is allowed to decelerate the own vehicle P or conduct preparation for deceleration thereof correspondingly to the weather around the own vehicle P. For example, when the weather around the own vehicle P is heavy rain or heavy snow, the own-vehicle controlling part 52 is allowed to decelerate the own vehicle P to a stronger extent than a situation where the weather around the own vehicle P is fine. Meanwhile, the own-vehicle controlling part 52 is allowed to conduct only shift-down or only alarm, without conducting braking control, in case of icy road. In this case, there is prevented slippage of the own vehicle P.

(Sixth Embodiment)

There will be described below a sixth embodiment of the present invention based on the drawings. There will be firstly described a configuration and constituent elements of an own-vehicle controlling apparatus 6 according to the sixth embodiment, with reference to FIG. 8 and FIG. 19. Here, FIG. 19 is a block diagram showing the configuration of the own-vehicle controlling apparatus 6.

As shown in FIG. 8 and FIG. 19, the own-vehicle controlling apparatus 6 is mounted on an own vehicle P, and is provided by substituting the own-vehicle controlling part 52 of the own-vehicle controlling apparatus 5 by an own-vehicle controlling part 62.

The own-vehicle controlling part 62 comprises a vehicle speed sensor (not shown), and detect a velocity of the own vehicle P by the vehicle speed sensor. Further, the own-vehicle controlling part 62 acquires judgment data from the measuring-target point storing memory 12. Then, the own-vehicle controlling part 62 conducts the same procedures as the own-vehicle controlling part 52 as well as the following procedure, based on the acquired judgment data, the detected velocity of the own vehicle P, own-vehicle controlling signals provided by the detection-result outputting part 14, and the own-lane signal provided by the lane detecting part 51. Namely, the own-vehicle controlling part 62 judges whether the velocity of the own vehicle P is zero, i.e., whether the own vehicle P is in stoppage. Based on the result therefrom, when the own vehicle P is in stoppage, it is judged whether a first preceding vehicle is present on the own lane. Based on the result therefrom, when the first preceding vehicle is present on the own lane, the own-vehicle controlling part 62 further judges whether a second or another preceding vehicle is present in-between the own vehicle P and the first preceding vehicle. Based on the result therefrom, in case of presence of the second preceding vehicle, it is judged whether the first preceding vehicle is to start. Based on the result therefrom, when the first preceding vehicle is about to start, there is conducted preparation of starting for the own vehicle P. More specifically, idling of the own vehicle P is started, for example.

The steps of process to be conducted by the own-vehicle controlling apparatus 6 are the same as those to be conducted by the own-vehicle controlling apparatus 5, so that the explanation thereof shall be omitted.

In the above manner, the own-vehicle controlling apparatus 6 according to the sixth embodiment conducts preparation of starting for the own vehicle P which is in stoppage, when a first preceding vehicle is to start, under the condition that the first preceding vehicle is present on the own lane, and a second or another preceding vehicle is present in-between the own vehicle P and the first preceding vehicle. In this way, the own-vehicle controlling apparatus 6 is allowed to commence preparation of starting before starting of the second preceding vehicle such as just in front of the own vehicle P, so that the own vehicle P is allowed to be smoothly started upon commencement of starting of the second preceding vehicle.

(Seventh Embodiment)

There will be described below a seventh embodiment of the present invention based on the drawings. There will be firstly described a configuration and constituent elements of an own-vehicle controlling apparatus 7 according to the seventh embodiment, with reference to FIG. 8, FIG. 9, and FIG. 19 through FIG. 21. Here, FIG. 20 is a block diagram showing a configuration of the own-vehicle controlling apparatus 7, and FIG. 21 is a schematic plan view showing a distribution of noise regions and ordinary regions.

Figure 20:
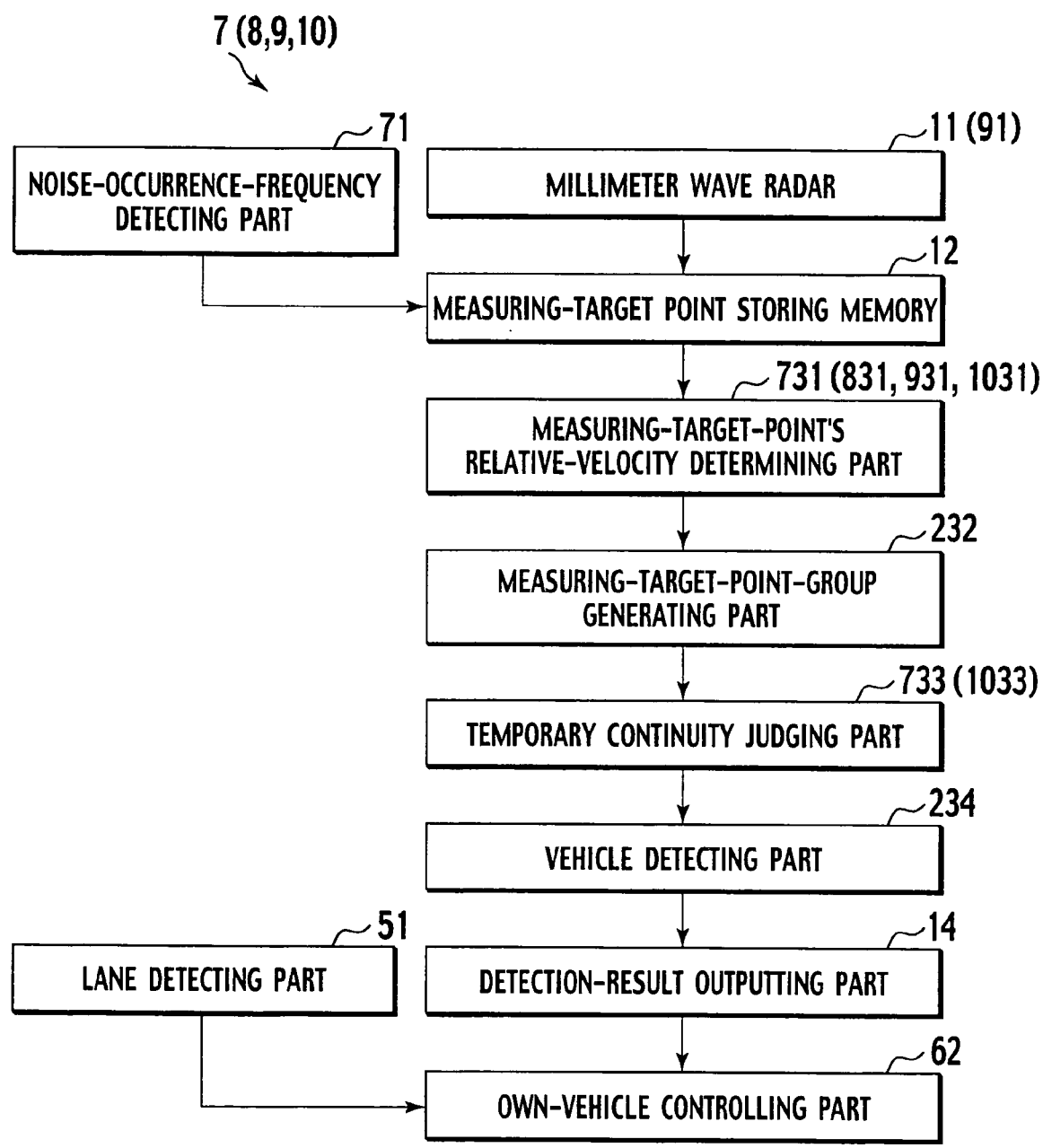
FIG. 20 is a functional block diagram describing a control flow of yet further embodiments of the invention.
Figure 21:
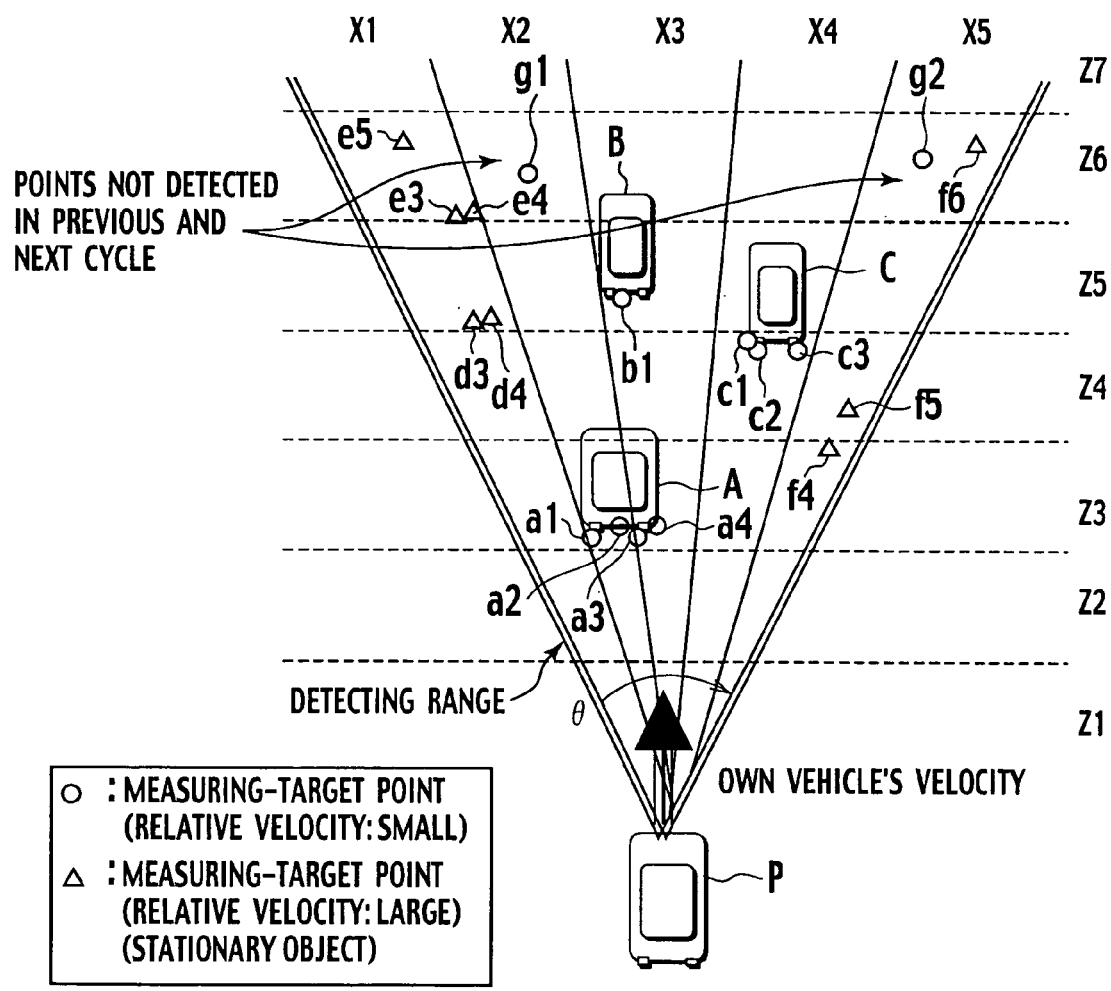
FIG. 21 is a plan view with an illustrative distribution of measuring-target points.

As shown in FIG. 8, FIG. 19 and FIG. 20, the own-vehicle controlling apparatus 7 is mounted on an own vehicle P, and achieved by providing the own-vehicle controlling apparatus 6 with a noise-occurrence-frequency detecting part 71, and by substituting the measuring-target-point relative-velocity determining part 431 and temporal continuity judging part 333 of the own-vehicle controlling apparatus 6 by a measuring-target-point relative-velocity determining part 731 and a temporal continuity judging part 733, respectively. Note that the seventh embodiment includes a phase space corresponding to a detecting range of a millimeter wave radar 11 as shown in FIG. 21, and the phase space is divided into five X-regions X1 through X5 in a θ direction and seven Z-regions Z1 through Z7 in a Z direction, thereby defining totally 35 divisional regions. Note that the angle θ is defined by the horizontal detecting range of the millimeter wave radar 11. Further, each divisional region is specified by the X-region and Z-region, to which the divisional region belongs. For example, the divisional region belonging to the X-region X1 and Z-region Z1 is defined as a divisional region (X1, Z1).

The measuring-target-point relative-velocity determining part 731 comprises a vehicle speed sensor (not shown), and detects the velocity of the own vehicle P by the vehicle speed sensor.

Further, the measuring-target-point relative-velocity determining part 731: conducts the same procedures as the measuring-target-point relative-velocity determining part 231, when noise-region data are not stored in the measuring-target point storing memory 12; and acquires the noise-region data when those data are stored in the measuring-target point storing memory 12, and recognizes noise regions and ordinary regions based on the noise-region data. Here, the "noise region" means that divisional region the noise-occurrence frequency of which is equal to or larger than a reference frequency (such as 3 times/sec), and the "ordinary region" means those divisional regions other than the noise regions. Thus, the possibility that those measuring-target points detected in noise regions are noises, is larger than the possibility that those measuring-target points detected in ordinary regions are noises.

Then, the measuring-target-point relative-velocity determining part 731 conducts the same procedure as the measuring-target-point-group generating part 131 to thereby generate measuring-target-point data, and stores those data in the measuring-target point storing memory 12. Then, the measuring-target-point relative-velocity determining part 731 acquires the measuring-target-point data from the measuring-target point storing memory 12. Then, the measuring-target-point relative-velocity determining part 731 conducts the same procedure as the measuring-target-point relative-velocity determining part 231 based on the acquired measuring-target-point data, after setting the conditions for preceding vehicle, as follows.

Namely, the measuring-target-point relative-velocity determining part 731 sets different conditions for preceding vehicle, for ordinary regions and noise regions, respectively. Thus, the condition for a preceding vehicle set for ordinary regions is applied to measuring-target points present in ordinary regions, while the condition for a preceding vehicle set for noise regions is applied to measuring-target points present in noise regions.

More specifically, the measuring-target-point relative-velocity determining part 731 sets the conditions for preceding vehicle, such that the condition for a preceding vehicle to be set for noise regions becomes stricter than the condition for a preceding vehicle to be set for ordinary regions. As described above, the possibility that those measuring-target points detected in noise regions are noises, is larger than the possibility that those measuring-target points detected in ordinary regions are noises, so that it is necessary to extract specific points in noise regions in a more careful manner than in ordinary regions. For example, the condition for a preceding vehicle set for ordinary regions is: to have a relative velocity within the reference velocity range $\beta1$, when the velocity of the own vehicle P is larger than an own vehicle reference velocity (such as 30(km/h)); and to have a relative velocity in the positive direction, when the velocity of the own vehicle P is at the own vehicle reference velocity or lower. Further, the maximum value of the reference velocity range $\beta1$ is a positive value to be exemplarily obtained by multiplying the velocity of the own vehicle P by a prescribed ratio (such as 50(%)), while the minimum value is a negative value having the same absolute value as the maximum value. Contrary, the condition for a preceding vehicle to be set for noise regions is: to have a relative velocity within a reference velocity range $\beta2$ narrower than the reference velocity range $\beta1$, when the velocity of the own vehicle P is higher than an own vehicle reference velocity; and to have a sufficiently large relative velocity (such as a relative velocity of 30(km/h) or higher) in the positive direction, when the velocity of the own vehicle P is at the own vehicle reference velocity or lower.

For example, in the situation shown in FIG. 9, there may be set measuring-target points a1 to a4, b1, c1 to c3, d3 to d4, e3 to e5, f4 to f6, and g1 to g2 based on reflected waves from preceding vehicles A through C, building D, road sign E and road sidewall F as shown in FIG. 21. Note that the measuring-target points g1, g2 are noises, respectively.

Under this condition and when the divisional regions (X2, Z6) and (X5, Z6) are noise regions, the measuring-target-point relative-velocity determining part 731 applies: the condition for a preceding vehicle set for ordinary regions, to the measuring-target points a1 to a4, b1, c1 to c3, d3 to d4, e3 to e5, and f4 to f5, which are present in ordinary regions, respectively; and the condition for a preceding vehicle set for noise regions, to the measuring-target points f6, g1, g2, which are present in noise regions, respectively. In this way, there are extracted those specific points a1 to a4, b1, and c1 to c3 which meet the condition for preceding vehicles, from the measuring-target points a1 to a4, b1, c1 to c3, d3 to d4, e3 to e5, f4 to f6, and g1 to g2. Here, since the measuring-target points g1, g2 are subjected to application of the conditions for preceding vehicle to be set for noise regions, the measuring-target-point relative-velocity determining part 731 is allowed to eliminate the measuring-target points g1, g2 in a more reliable manner than the conventional.

The temporal continuity judging part 733: conducts the same procedures as the temporal continuity judging part 133, when noise-region data are not stored in the measuring-target point storing memory 12; and acquires the noise-region data when those data are stored in the measuring-target point storing memory 12, and conducts the following procedure. Namely, the temporal continuity judging part 733 recognizes the noise regions and ordinary regions, based on the noise-region data. Further, the temporal continuity judging part 733 acquires the extracted group data in the current cycle and the judgment data in the previous cycle, from the measuring-target point storing memory 12. Then, the temporal continuity judging part 733 conducts the same procedure as the temporal continuity judging part 133 based on the acquired data, after setting prescribed values N1, as follows.

The temporal continuity judging part 733 sets each prescribed value N1 as a larger value, for a smaller number of measuring-target points constituting the associated measuring-target point group in the current cycle. More specifically, the temporal continuity judging part 733 sets the prescribed value N1 to be 2 when the number of measuring-target points constituting the associated measuring-target point group in the current cycle is equal to or larger than a prescribed number (such as 2), and sets the prescribed value N1 to be 4 when the number (such as 1) of measuring-target points constituting the associated measuring-target point group in the current cycle is less than such a prescribed number.

Further, the temporal continuity judging part 733 sets prescribed values N1 for divisional regions, respectively. More specifically, the temporal continuity judging part 733 sets the prescribed values N1, such that the prescribed value N1 to be set for each noise region is larger than the prescribed value N1 to be set for each ordinary region. The prescribed values N1 are set in this way, for the reason that it is necessary to detect preceding vehicles in noise regions in a more careful manner than in ordinary regions because the possibility that those measuring-target points detected in noise regions are noises, is larger than the possibility that those measuring-target points detected in ordinary regions are noises, as described above.

The noise-occurrence-frequency detecting part 71 acquires the judgment data from the measuring-target point storing memory 12, and judges whether the acquired judgment data are present in a number sufficient for noise-region judgment, or not. Based on the result therefrom, the noise-occurrence-frequency detecting part 71 conducts the following procedure, when the acquired judgment data are present in a number sufficient for noise-region judgment. Namely, the noise-occurrence-frequency detecting part 71 calculates a noise-occurrence frequency (such as the number of times that noises have occurred per unit time) for each divisional region, and compares the calculated occurrence frequency with a reference frequency, region by region. Then, the noise-occurrence-frequency detecting part 71 judges those divisional regions having occurrence frequencies equal to or larger than the reference frequency, to be noise regions, and judges those divisional regions having occurrence frequencies less than the reference frequency, to be ordinary regions, respectively. Then, the noise-occurrence-frequency detecting part 71 generates noise-region data concerning the judgment, and stores those data in the measuring-target point storing memory 12.

There will be described below the steps of process to be conducted by the own-vehicle controlling apparatus 7. Firstly, the own-vehicle controlling apparatus 7 repeats the same procedures as the own-vehicle controlling apparatus 6, until the judgment data become present in a number sufficient for noise-region judgment. Thereafter, the noise-occurrence-frequency detecting part 71 acquires the judgment data from the measuring-target point storing memory 12, and judges each divisional region to be an ordinary region or noise region based on the acquired and associated judgment data. Namely, it conducts a noise-region judgment process. Then, the noise-occurrence-frequency detecting part 71 generates noise-region data concerning the judgments, respectively, and stores those data in the measuring-target point storing memory 12. As described above, the own-vehicle controlling apparatus 7 conducts procedures based on the noise-region data, thereby detecting preceding vehicles, for example. Meanwhile, based on the judgment data such as generated upon detection of preceding vehicles, the noise-occurrence-frequency detecting part 71 conducts the noise-region judgment process and sequentially updates the noise-region data.

In the above manner, and for the noise regions where noises are apt to occur among the divisional regions, the own-vehicle controlling apparatus 7 in the seventh embodiment sets the conditions for preceding vehicle in a stricter manner than in ordinary regions, and sets the prescribed values N1 into larger values, respectively. Thus, the own-vehicle controlling apparatus 7 is allowed to conduct the due procedures for measuring-target points and measuring-target point groups present in noise regions, respectively, in a more careful manner than in ordinary regions, thereby making it possible to eliminate noises more precisely than the conventional.

(Eighth Embodiment)

There will be described below an eighth embodiment of the present invention based on the drawings. There will be firstly described a configuration and constituent elements of an own-vehicle controlling apparatus 8 according to the eighth embodiment, with reference to FIG. 8, FIG. 9, FIG. 20 and FIG. 21.

As shown FIG. 8 and FIG. 20, the own-vehicle controlling apparatus 8 is mounted on an own vehicle P, and is provided by substituting the measuring-target-point relative-velocity determining part 731 of the own-vehicle controlling apparatus 7 by a measuring-target-point relative-velocity determining part 831. Note that the eighth embodiment includes a phase space corresponding to a detecting range of a millimeter wave radar 11 as shown in FIG. 21, and the phase space is divided into five X-regions X1 through X5 in a θ direction and seven Z-regions Z1 through Z7 in a Z direction, thereby defining totally 35 divisional regions.

The measuring-target-point relative-velocity determining part 831 comprises a vehicle speed sensor (not shown), and detects a velocity of the own vehicle P by the vehicle speed sensor.

Further, the measuring-target-point relative-velocity determining part 831: conducts the same procedures as the measuring-target-point relative-velocity determining part 231, when noise-region data are not stored in the measuring-target point storing memory 12; and acquires the noise-region data when those data are stored in the measuring-target point storing memory 12, and recognizes noise regions and ordinary regions based on the noise-region data.

Then, the measuring-target-point relative-velocity determining part 831 conducts the same procedures as the measuring-target-point-group generating part 131 to thereby generate measuring-target-point data, and stores those data in the measuring-target point storing memory 12. Then, the measuring-target-point relative-velocity determining part 831 acquires the measuring-target-point data from the measuring-target point storing memory 12, and conducts the following procedure based on the acquired measuring-target-point data. Namely, the measuring-target-point relative-velocity determining part 831 extracts, as specific points, those measuring-target points present in the ordinary regions, which meet the conditions for preceding vehicle, respectively. Further, the measuring-target-point relative-velocity determining part 831 extracts, as specific points, those measuring-target points present in the noise regions, which meet the conditions for preceding vehicle or conditions for running objects, respectively. Then, the measuring-target-point relative-velocity determining part 831 generates extracted measuring-target-point data concerning the extracted measuring-target points, respectively, and outputs those data to the measuring-target-point-group generating part 232.

Here, the conditions for preceding vehicle are the same as those in the second embodiment. Further, the conditions for running objects are to be not to have relative velocities of stationary objects. Note that relative velocities of stationary objects are to have the same magnitude as the velocity of the own vehicle P and in the direction opposite thereto.

The steps of process to be conducted by the own-vehicle controlling apparatus 8 are the same as those to be conducted by the own-vehicle controlling apparatus 7, so that the explanation thereof shall be omitted.

In the above manner, and for the noise regions where noises occur easier than ordinary regions among the divisional regions, the own-vehicle controlling apparatus 8 in the eighth embodiment sets the prescribed values N1 into larger values, than in ordinary regions, respectively. Thus, in the noise regions, measuring-target point groups are judged to be noises easier than in the ordinary regions, thereby causing a possibility that measuring-target point groups corresponding to preceding vehicles are also judged to be noises. As such, in the noise regions, the own-vehicle controlling apparatus 8 is configured to extract: those measuring-target points meeting the conditions of running objects, in addition to those measuring-target points meeting the conditions for preceding vehicle; as specific points. Namely, the own-vehicle controlling apparatus 8 is allowed to generate, in noise regions, more measuring-target point groups to be subjected to judgment of preceding vehicle, than in the seventh embodiment, so that the possibility, that those measuring-target point groups corresponding to preceding vehicles are judged to be noises, is made smaller than that in the seventh embodiment.

(Ninth Embodiment)

There will be described below a ninth embodiment of the present invention based on the drawings. There will be firstly described a configuration and constituent elements of an own-vehicle controlling apparatus 9 according to the ninth embodiment, with reference to FIG. 8, FIG. 9, FIG. 20 and FIG. 21.

As shown FIG. 8 and FIG. 20, the own-vehicle controlling apparatus 9 is mounted on an own vehicle P, and is provided by substituting the measuring-target-point relative-velocity determining part 831 of the own-vehicle controlling apparatus 8 by a measuring-target-point relative-velocity determining part 931. Note that the ninth embodiment includes a phase space corresponding to a detecting range of a millimeter wave radar 11 as shown in FIG. 21, and the phase space is divided into five X-regions X1 through X5 in a θ direction and seven Z-regions Z1 through Z7 in a Z direction, thereby defining totally 35 divisional regions, identically to the seventh embodiment.

The measuring-target-point relative-velocity determining part 931 sets measuring-target points and detects positions, relative velocities and intensities of the measuring-target points based on reflected waves, generates measuring-target-point data concerning the positions, relative velocities and intensities of the measuring-target points, respectively, and stores those data in a measuring-target point storing memory 12.

The measuring-target-point relative-velocity determining part 931 comprises a vehicle speed sensor (not shown), and detects a velocity of the own vehicle P by the vehicle speed sensor.

Further, the measuring-target-point relative-velocity determining part 931: conducts the same procedures as the measuring-target-point relative-velocity determining part 231, when noise-region data are not stored in the measuring-target point storing memory 12; and acquires the noise-region data when those data are stored in the measuring-target point storing memory 12, and recognizes noise regions and ordinary regions based on the noise-region data.

Then, the measuring-target-point relative-velocity determining part 931 acquires the measuring-target-point data from the measuring-target point storing memory 12. Then, the measuring-target-point relative-velocity determining part 931 conducts the same procedures as the measuring-target-point relative-velocity determining part 231 based on the acquired measuring-target-point data, after setting the conditions for preceding vehicle as follows.

Namely, the measuring-target-point relative-velocity determining part 931 sets different conditions for preceding vehicle, for ordinary regions and noise regions, respectively. Thus, the condition for a preceding vehicle set for ordinary regions is applied to measuring-target points present in ordinary regions, while the condition for a preceding vehicle set for noise regions is applied to measuring-target points present in noise regions.

More specifically, the measuring-target-point relative-velocity determining part 931 sets such a condition for a preceding vehicle for noise regions, which is provided by adding: a condition that intensities of measuring-target points are equal to or larger than a reference intensity; to the condition for a preceding vehicle provided in the seventh embodiment. Meanwhile, the condition for a preceding vehicle to be set for ordinary regions are the same as the condition for a preceding vehicle provided in the seventh embodiment.

The steps of process to be conducted by the own-vehicle controlling apparatus 9 are the same as those to be conducted by the own-vehicle controlling apparatus 7, so that the explanation thereof shall be omitted.

In the above manner, the own-vehicle controlling apparatus 9 in the ninth embodiment sets the condition for a preceding vehicle for noise regions where noises are apt to occur among the divisional regions, by adding: a condition that intensities of measuring-target points are equal to or larger than a reference intensity; to the condition for a preceding vehicle provided in the seventh embodiment. Here, intensities of measuring-target points corresponding to preceding vehicles are stronger than intensities of measuring-target points corresponding to noises. Thus, the own-vehicle controlling apparatus 9 is capable of detecting preceding vehicles even in noise regions, in a more accurate manner than the seventh and eighth embodiments.

(Tenth Embodiment)

There will be described below a tenth embodiment of the present invention based on the drawings. There will be firstly described a configuration and constituent elements of an own-vehicle controlling apparatus 10 according to the tenth embodiment, with reference to FIG. 8, FIG. 9, and FIG. 19 through FIG. 21.

As shown FIG. 8 and FIG. 20, the own-vehicle controlling apparatus 10 is mounted on an own vehicle P, and is provided by substituting the measuring-target-point relative-velocity determining part 731 and temporal continuity judging part 733 of the own-vehicle controlling apparatus 7, by a measuring-target-point relative-velocity determining part (measuring-target-point extracting means) 1031 and a temporal continuity judging part (temporal continuity judging means) 1033, respectively. Note that the tenth embodiment includes a phase space corresponding to a detecting range of a millimeter wave radar 11 as shown in FIG. 21, and the phase space is divided into five X-regions X1 through X5 in a θ direction and seven Z-regions Z1 through Z7 in a Z direction, thereby defining totally 35 divisional regions, identically to the seventh embodiment.

The measuring-target-point relative-velocity determining part 1031 comprises a vehicle speed sensor (not shown), and detects a velocity of the own vehicle P by the vehicle speed sensor.

Further, the measuring-target-point relative-velocity determining part 1031: conducts the same procedures as the measuring-target-point relative-velocity determining part 231, when noise-region data are not stored in the measuring-target point storing memory 12; and acquires the noise-region data when those data are stored in the measuring-target point storing memory 12, and recognizes noise regions and ordinary regions based on the noise-region data.

Then, the measuring-target-point relative-velocity determining part 1031 conducts the same procedures as the measuring-target-point-group generating part 131 to thereby generate measuring-target-point data, and stores those data in the measuring-target point storing memory 12. Then, the measuring-target-point relative-velocity determining part 1031 acquires the measuring-target-point data and the judgment data from the measuring-target point storing memory 12, and sets conditions for preceding vehicle for ordinary regions and noise regions, respectively, based on the acquired data, similarly to the seventh embodiment. Then, the measuring-target-point relative-velocity determining part 1031 extracts those measuring-target points present in the ordinary regions as specific points, which meet the condition for a preceding vehicle set for ordinary regions. Further, the measuring-target-point relative-velocity determining part 1031 calculates trajectories of the specific points, based on relative velocity data included in the judgment data. Then, the measuring-target-point relative-velocity determining part 1031 applies: the condition for a preceding vehicle set for ordinary regions, to those measuring-target points present in noise regions, which are located on the calculated trajectories; and the condition for a preceding vehicle set for noise regions, to those measuring-target points present in noise regions, which are not located on the calculated trajectories. Then, the measuring-target-point relative-velocity determining part 1031 extracts specific points from the measuring-target points present in the noise regions. Further, the measuring-target-point relative-velocity determining part 1031 generates extracted measuring-target-point data concerning the specific points, respectively, and outputs those data to the measuring-target-point-group generating part 232.

Further, the temporal continuity judging part 1033: conducts the same procedures as the temporal continuity judging part 133, when noise-region data are not stored in the measuring-target point storing memory 12; and acquires the noise-region data when those data are stored in the measuring-target point storing memory 12, and conducts the following procedure. Namely, the temporal continuity judging part 1033 recognizes the noise regions and ordinary regions, based on the noise-region data. Further, the temporal continuity judging part 1033 acquires the extracted group data in the current cycle and the judgment data in the previous cycle, from the measuring-target point storing memory 12. Then, the temporal continuity judging part 1033 sets prescribed values N1 for the ordinary regions and noise regions, respectively, based on the acquired data, similarly to the seventh embodiment. Further, the temporal continuity judging part 1033 calculates trajectories of the specific points, based on the relative velocity data included in the judgment data, respectively. Then, the temporal continuity judging part 1033 applies the prescribed value N1 set for ordinary regions, to each of the measuring-target point groups in the current cycle and present in the ordinary regions, and conducts the same procedure as the temporal continuity judging part 133. Further, the temporal continuity judging part 1033: applies the prescribed value N1 set for ordinary regions, to those measuring-target point groups which are present in the noise regions and located on the calculated trajectories, respectively; and conducts the same procedure as the temporal continuity judging part 133. Moreover, the temporal continuity judging part 1033: applies the prescribed value N1 set for noise regions, to those measuring-target point groups which are present in the noise regions and which are not located on the calculated trajectories, respectively; and conducts the same procedure as the temporal continuity judging part 133. Then, the temporal continuity judging part 1033 generates judgment data in the current cycle based on these procedures, and stores those data in the measuring-target point storing memory 12.

The steps of process to be conducted by the own-vehicle controlling apparatus 10 are the same as those to be conducted by the own-vehicle controlling apparatus 7, so that the explanation thereof shall be omitted.

In the above manner, and for the noise regions where noises are apt to occur among the divisional regions, the own-vehicle controlling apparatus 10 in the tenth embodiment sets the conditions for preceding vehicle in a stricter manner than in ordinary regions, and sets the prescribed values N1 into larger values, respectively. Thus, in the noise regions, it is likely that specific points are not extracted, or measuring-target point groups corresponding to preceding vehicles are judged to be noises, because such a likelihood is larger than a likelihood in ordinary regions.

As such, the own-vehicle controlling apparatus 10 is configured to apply: the condition for a preceding vehicle set for ordinary regions, and the prescribed value N1; to each of those measuring-target points and measuring-target point groups present in noise regions, which are located on trajectories of the specific points; i.e., to each of those measuring-target points and measuring-target point groups which have higher possibilities that which correspond to preceding vehicles, than other measuring-target points and measuring-target point groups. Namely, the conditions for preceding vehicle set for ordinary regions and the prescribed values N1 are applied to those measuring-target point groups which have been once judged to be preceding vehicles, respectively, even when such measuring-target point groups have entered the noise regions, respectively.

In this way, the own-vehicle controlling apparatus 10 is capable of decreasing such a possibility that specific points are not extracted or that measuring-target point groups corresponding to preceding vehicles are judged to be noises, respectively, as compared with the possibilities of the seventh through ninth embodiments.

The first through tenth embodiments have been described about usage of a millimeter wave radar, the present invention is not limited thereto. Only, usage of those having frequencies substantially the same as the frequencies of millimeter wave radars enables to obtain the above described effects, more preferably than usage of other kinds of radars. Further, it is possible to mutually combine the techniques described in the first through tenth embodiments, in an appropriate manner.

The contents of Japanese Patent Application No. 2003-410413, filed Dec. 9, 2003, are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A preceding-vehicle detecting apparatus comprising:
a recognizer configured to recognize a measuring-target point group which is assumable to be a preceding vehicle; and
a decider configured to decide, the measuring-target point group having been continuously recognized by the recognizing part over a significant period of time, to be the preceding vehicle, wherein the recognizer comprises:
a transmitting part emitting scan waves in a forward direction of an own vehicle;
a receiving part receiving reflected waves of the scan waves;
a measuring-target-point setting part setting measuring-target points based on the reflected waves;
a distance calculating part calculating a distance from the own vehicle to each measuring-target point and the position of the measuring-target point, based on the reflected waves;
a distance-change calculating part calculating changes between the distances in a previous cycle and those in a current cycle, respectively;
a relative-velocity calculating part calculating a relative velocity of each measuring-target point with respect to the own vehicle, based on the applicable distance change;
a by-velocity group generating part grouping the measuring-target points by relative velocities, thereby generating by-velocity groups;
a measuring-target-point-group generating part single-connecting measuring-target points with each other in each by-velocity group based on positions of the measuring-target points, thereby generating measuring-target point groups, respectively; and
a measuring-target-point-group extracting part extracting those measuring-target point groups among the measuring-target point groups, which meet the conditions for preceding vehicle, respectively; and wherein the decider comprises a temporal continuity judging part regarding that measuring-target point group as a preceding vehicle, which has been continuously extracted a first prescribed number of times or more times.

2. The preceding-vehicle detecting apparatus as claimed in claim 1, wherein the conditions for preceding vehicle include: a condition to have a relative velocity within a prescribed reference velocity range when the own vehicle velocity is larger than an own vehicle prescribed reference velocity; and a condition to have a relative velocity in a direction away from the own vehicle when the own vehicle velocity is at the own vehicle reference velocity or lower.

3. The preceding-vehicle detecting apparatus as claimed in claim 2, wherein the reference velocity range has its maximum value obtained by multiplying the own vehicle velocity by a prescribed ratio.

4. The preceding-vehicle detecting apparatus as claimed in claim 1, wherein the temporal continuity judging part estimates that each of the measuring-target point groups has been continuously extracted, even when the measuring-target point group has not been continuously extracted that number of times which is equal to or less than a second prescribed number of times.

5. The preceding-vehicle detecting apparatus as claimed in claim 4, wherein the second prescribed number of times is smaller, as the number of measuring-target points constituting the measuring target-point group is larger.

6. The preceding-vehicle detecting apparatus as claimed in claim 1, further comprising: a measuring-target-point extracting part extracting those specific points from the measuring-target points, which meet the conditions for preceding vehicle, respectively; and
wherein the measuring-target-point-group generating part generates the measuring-target point groups, from the specific points only.

7. The preceding-vehicle detecting apparatus as claimed in claim 6, further comprising a noise-occurrence-frequency detecting part dividing a phase space into divisional regions, and detecting a noise-occurrence frequency in each divisional region; and
wherein the first prescribed number of times is set for each divisional region, and
wherein the first prescribed number of times set for that noise region among the divisional region which has the noise-occurrence frequency larger than a prescribed reference frequency, is set to be larger than the first prescribed number of times set for that ordinary region among the divisional regions which is other than the noise region.

8. The preceding-vehicle detecting apparatus as claimed in claim 6, further comprising a noise-occurrence-frequency detecting part dividing a phase space into divisional regions, and detecting a noise-occurrence frequency in each divisional region; and
wherein the condition for a preceding vehicle is set for each divisional region, and
wherein the condition for a preceding vehicle set for that noise region among the divisional region which has the noise-occurrence frequency larger than a prescribed reference frequency, is stricter than the condition for a preceding vehicle set for that ordinary region among the divisional regions which is other than the noise region.

9. The preceding-vehicle detecting apparatus as claimed in claim 7, wherein in the noise regions, the specific points include measuring-target points meeting the conditions for running objects, in addition to those measuring-target points meeting the conditions for preceding vehicle; and
wherein the measuring-target-point-group extracting part extracts those among the measuring-target point groups which meet the conditions for the running objects, in addition to extraction of the measuring-target point groups meeting the conditions for preceding vehicle.

10. The preceding-vehicle detecting apparatus as claimed in claim 7, further comprising an intensity detecting part detecting intensities of the measuring-target points, respectively, and
wherein the conditions for preceding vehicle to be set for the noise regions include a condition that the measuring-target point has an intensity equal to or larger than a prescribed reference intensity.

11. The preceding-vehicle detecting apparatus as claimed in claim 7, wherein the first prescribed number of times and the condition for a preceding vehicle both to be set for the ordinary region, are applied to that measuring-target point group which has been once regarded as a preceding vehicle, even when the measuring-target point group has entered the noise region.

12. The preceding-vehicle detecting apparatus as claimed in claim 1, wherein the scan waves have frequencies which are substantially the same as frequencies of millimeter wave radars.

13. The preceding-vehicle detecting apparatus as claimed in claim 1, wherein the first prescribed number of times is set as a larger value, for a smaller number of measuring-target points constituting an associated measuring-target point group in the current cycle.

14. An own-vehicle controlling apparatus, comprising:
a recognizer configured to recognize a measuring-target point group which is assumable to be a preceding vehicle;
a decider configured to decide, the measuring-target point group having been continuously recognized by the recognizing part over a significant period of time, to be the preceding vehicle;
a lane detector configured to detect a lane on which an own vehicle is cruising; and
an own-vehicle controller configured to conduct a cruising control of the own vehicle correspondingly to a running state of a preceding vehicle, when the preceding vehicle is present on the lane and an object is present between the preceding vehicle and the own vehicle, wherein the recognizer comprises:
a transmitting part emitting scan waves in a forward direction of an own vehicle;
a receiving part receiving reflected waves of the scan waves;
a measuring-target-point setting part setting measuring-target points based on the reflected waves;
a distance calculating part calculating a distance from the own vehicle to each measuring-target point and the position of the measuring-target point, based on the reflected waves;
a distance-change calculating part calculating changes between the distances in a previous cycle and those in a current cycle, respectively;
a relative-velocity calculating part calculating a relative velocity of each measuring-target point with respect to the own vehicle, based on the applicable distance change;
a by-velocity group generating part grouping the measuring-target points by relative velocities, thereby generating by-velocity groups;

a measuring-target-point-group generating part single-connecting measuring-target points with each other in each by-velocity group based on positions of the measuring-target points, thereby generating measuring-target point groups, respectively; and a measuring-target-point-group extracting part extracting those measuring-target point groups among the measuring-target point groups, which meet the conditions for preceding vehicle, respectively; and wherein the decider comprises a temporal continuity judging part regarding that measuring-target point group as a preceding vehicle, which has been continuously extracted a first prescribed number of times or more times.

15. The own-vehicle controlling apparatus as claimed in claim 14, wherein the own-vehicle controller decelerates the own vehicle or conducts preparation for deceleration thereof, when the preceding vehicle is present on the lane, an object is present between the preceding vehicle and the own vehicle, and the relative velocity of the preceding vehicle becomes equal to or less than a prescribed reference velocity.

16. The own-vehicle controlling apparatus as claimed in claim 14, wherein the own-vehicle controller conducts preparation of starting for the own vehicle, when the preceding vehicle is present on the lane, an object is present between the preceding vehicle and the own vehicle, and the relative velocity of the preceding vehicle is in a direction away from the own vehicle during stoppage of the own vehicle.

17. The own-vehicle controlling apparatus as claimed in claim 14, wherein the first prescribed number of times is set as a larger value, for a smaller number of measuring-target points constituting an associated measuring-target point group in the current cycle.

18. A preceding-vehicle recognizing method, comprising:
recognizing a measuring-target point group which is assumable to be a preceding vehicle; and
deciding, the measuring-target point group having been continuously recognized over a significant period of time, to be the preceding vehicle, wherein the recognizing comprises:
emitting scan waves in a forward direction of an own vehicle;
receiving reflected waves of the scan waves;
setting measuring-target points based on the reflected waves;
calculating a distance from the own vehicle to each measuring-target point and the position of the measuring-target point, based on the reflected waves;
calculating changes between the distances in a previous cycle and those in a current cycle, respectively;
calculating a relative velocity of each measuring-target point with respect to the own vehicle, based on the applicable distance change;
grouping the measuring-target points by relative velocities, thereby generating by-velocity groups;
single-connecting measuring-target points with each other in each by-velocity group based on positions of the measuring-target points, thereby generating measuring-target point groups, respectively; and
extracting those measuring-target point groups among the measuring-target point groups, which meet the conditions for preceding vehicle, respectively; and wherein the deciding comprises regarding that measuring-target point group as a preceding vehicle, which has been continuously extracted a first prescribed number of times or more times.

19. The preceding-vehicle detecting method as claimed in claim 18, wherein the first prescribed number of times is set as a larger value, for a smaller number of measuring-target points constituting an associated measuring-target point group in the current cycle.

20. A preceding-vehicle detecting apparatus comprising:
recognizing means for recognizing a measuring-target point group which is assumable to be a preceding vehicle; and
deciding means for deciding, the measuring-target point group having been continuously recognized by the recognizing part over a significant period of time, to be the preceding vehicle, wherein the recognizing means comprises:
transmitting means for emitting scan waves in a forward direction of an own vehicle;
receiving means for receiving reflected waves of the scan waves;
measuring-target-point setting means for setting measuring-target points based on the reflected waves;
distance calculating means for calculating a distance from the own vehicle to each measuring-target point and the position of the measuring-target point, based on the reflected waves;
distance-change calculating means for calculating changes between the distances in a previous cycle and those in a current cycle, respectively;
relative-velocity calculating means for calculating a relative velocity of each measuring-target point with respect to the own vehicle, based on the applicable distance change;
velocity-layered-group generating means for grouping the measuring-target points by relative velocities, thereby generating by-velocity groups;
measuring-target-point-group generating means for single-connecting measuring-target points with each other in each by-velocity group based on positions of the measuring-target points, thereby generating measuring-target point groups, respectively; and
measuring-target-point-group extracting means for extracting those measuring-target point groups among the measuring-target point groups, which meet the conditions for preceding vehicle, respectively; and
wherein the deciding means comprises temporal continuity judging means for regarding that measuring-target point group as a preceding vehicle, which has been continuously extracted a first prescribed number of times or more times.

21. The preceding-vehicle detecting apparatus as claimed in claim 20, wherein the first prescribed number of times is set as a larger value, for a smaller number of measuring-target points constituting an associated measuring-target point group in the current cycle.

* * * * *